(12) United States Patent
Togashi

(10) Patent No.: US 10,969,870 B2
(45) Date of Patent: Apr. 6, 2021

(54) INPUT DEVICE

(71) Applicant: SHARP KABUSHIKI KAISHA, Sakai (JP)

(72) Inventor: Yasuyuki Togashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/628,014

(22) PCT Filed: Jul. 3, 2018

(86) PCT No.: PCT/JP2018/025213
§ 371 (c)(1),
(2) Date: Dec. 31, 2019

(87) PCT Pub. No.: WO2019/013044
PCT Pub. Date: Jan. 17, 2019

(65) Prior Publication Data
US 2020/0174571 A1    Jun. 4, 2020

(30) Foreign Application Priority Data

Jul. 10, 2017    (JP) .............................. JP2017-134762

(51) Int. Cl.
*G06F 3/041*    (2006.01)
*G06F 3/044*    (2006.01)
*G06F 3/01*    (2006.01)

(52) U.S. Cl.
CPC ............ *G06F 3/016* (2013.01); *G06F 3/0443* (2019.05); *G06F 2203/04105* (2013.01)

(58) Field of Classification Search
CPC ...... B60K 2370/143; B60K 2370/1438; G06F 3/03547; G06F 3/041; G06F 3/0412; G06F 3/0416; G06F 3/044; G06F 3/0488; G06F 2203/04105
See application file for complete search history.

(56) References Cited

U.S. PATENT DOCUMENTS

| | | | |
|---|---|---|---|
| 2003/0038776 A1* | 2/2003 | Rosenberg | G06F 3/016 345/156 |
| 2003/0048250 A1* | 3/2003 | Boon | G06F 3/03547 345/156 |
| 2003/0067449 A1* | 4/2003 | Yoshikawa | G06F 3/016 345/173 |
| 2003/0122779 A1* | 7/2003 | Martin | G06F 3/0488 345/156 |

(Continued)

FOREIGN PATENT DOCUMENTS

JP    2005-222551 A    8/2005

*Primary Examiner* — Michael J Eurice
(74) *Attorney, Agent, or Firm* — ScienBiziP, P.C.

(57) ABSTRACT

An input device includes an input member to which a pressing operation is input, a base member on which the input member is mounted, an actuator disposed at least on an input member side and configured to vibrate the input member in a direction perpendicular to a pressing direction of the pressing operation, a braking member disposed to be in contact with the input member, a holding member disposed on a base member side and holding the braking member, and a position adjusting mechanism configured to adjust a position of at least one of the input member and the holding member with respect to the pressing direction.

20 Claims, 20 Drawing Sheets

(56) References Cited

U.S. PATENT DOCUMENTS

| | | | | |
|---|---|---|---|---|
| 2005/0157893 A1* | 7/2005 | Pelrine | ................ | B64C 23/005 381/190 |
| 2005/0225539 A1* | 10/2005 | Prados | ................ | B60K 37/06 345/173 |
| 2006/0109256 A1* | 5/2006 | Grant | ................ | G06F 3/0485 345/173 |
| 2008/0060856 A1* | 3/2008 | Shahoian | ................ | G06F 3/016 178/18.03 |
| 2009/0289779 A1* | 11/2009 | Braun | ................ | G06F 3/016 340/407.2 |
| 2010/0245254 A1* | 9/2010 | Olien | ................ | G06F 3/016 345/173 |
| 2010/0277430 A1* | 11/2010 | Cruz-Hernandez | ................ | G06F 3/016 345/173 |
| 2010/0309141 A1* | 12/2010 | Cruz-Hernandez | ................ | G06F 3/016 345/173 |
| 2011/0021272 A1* | 1/2011 | Grant | ................ | A63F 13/10 463/30 |
| 2011/0025609 A1* | 2/2011 | Modarres | ................ | H01L 41/04 345/173 |
| 2011/0043454 A1* | 2/2011 | Modarres | ................ | G06F 3/016 345/173 |
| 2011/0141052 A1* | 6/2011 | Bernstein | ................ | G09G 5/006 345/174 |
| 2011/0255303 A1* | 10/2011 | Nichol | ................ | G02B 6/0018 362/606 |
| 2012/0212484 A1* | 8/2012 | Haddick | ................ | G02B 27/017 345/419 |
| 2013/0201127 A1* | 8/2013 | Abe | ................ | G06F 3/016 345/173 |
| 2013/0309941 A1* | 11/2013 | Grossman | ................ | A63H 33/00 446/486 |
| 2014/0139452 A1* | 5/2014 | Levesque | ................ | G06F 3/0414 345/173 |
| 2014/0362014 A1* | 12/2014 | Ullrich | ................ | G06F 3/016 345/173 |
| 2015/0116205 A1* | 4/2015 | Westerman | ................ | G06F 3/04812 345/156 |
| 2016/0179200 A1* | 6/2016 | Billington | ................ | G06F 3/041 345/173 |
| 2016/0321880 A1* | 11/2016 | Hamam | ................ | H04M 1/72594 |
| 2018/0197157 A1* | 7/2018 | Magee | ................ | G06Q 20/1085 |
| 2018/0217668 A1* | 8/2018 | Ligtenberg | ................ | H01H 13/785 |
| 2019/0339776 A1* | 11/2019 | Rosenberg | ................ | G06F 3/047 |

* cited by examiner

INPUT DEVICE

TECHNICAL FIELD

The present invention relates to an input device.

BACKGROUND ART

As an example of an input device including a conventional touch screen, the input device described in Patent Document 1 has been known. The input device described in Patent Document 1 is configured to include a touch screen, an actuator, and a substantially U-shaped spring. The touch screen is for inputting an instruction by touching or pressing the operation surface. The actuator is for moving the touch screen relative to a reference object in at least one direction. The spring is configured to mechanically couple the reference object to the touch screen.

RELATED ART DOCUMENT

Patent Document

Patent Document 1: Japanese Unexamined Patent Application Publication No. 2005-222551

Problem to be Solved by the Invention

The input device described in Patent Document 1 includes the touch panel that can be moved substantially in parallel to the operation surface by using the actuator. The U-shaped spring is configured to elastically deform in parallel to the operation surface. Accordingly, when the touch screen vibrates according to the oscillation of the actuator, the U-shaped spring elastically deforms repeatedly such that the vibrations gradually converge. However, since the spring is configured to elastically deform repeatedly, it may take much time to converge the vibrations of the touch screen. If so, the user who presses the operation surface may only realize that the vibrations simply occur in parallel to the operation surface and the user is less likely to have feeling of pressing the operation surface in the normal direction.

DISCLOSURE OF THE PRESENT INVENTION

The present invention was made in view of the above circumstances. An object is to improve haptic feedback performance.

Means for Solving the Problem

An input device according to the present invention includes an input member to which a pressing operation is input, a base member on which the input member is mounted, an actuator disposed at least on an input member side and configured to vibrate the input member in a direction perpendicular to a pressing direction of the pressing operation, a braking member disposed to be in contact with the input member, a holding member disposed on a base member side and holding the braking member, and a position adjusting mechanism configured to adjust a position of at least one of the input member and the holding member with respect to the pressing direction.

According to such configuration, when the actuator oscillates according to the input of a pressing operation to the input member, the input member vibrates relative to the base member in a direction perpendicular to the pressing direction. The vibrations can be transmitted to an inputter that has input the pressing operation. If the vibrations of the input member become less likely to converge, the inputter is likely to recognize that the input member simply vibrates in the direction perpendicular to the pressing direction. The inputter is less likely to recognize touching of pressing in the pressing direction, for example. In this respect, the holding member disposed on the base member side holds the braking member that is in contact with the input member. Therefore, the input member that vibrates with respect to the base member brakes with the braking member. Furthermore, the position of at least one of the input member and the holding member is adjusted by the position adjusting mechanism in the pressing direction such that the contact state of the braking member and the input member can be adjusted. Accordingly, the braking force of the braking member acting on the input member that vibrates with respect to the base member can be controlled and the vibrations of the input member effectively converge. Therefore, the inputter to which the vibrations are transferred via the input member easily feels as if it presses in the pressing direction and the haptic feedback can be properly made.

Advantageous Effect of the Invention

According to the present invention, haptic feedback performance can be improved.

MODES FOR CARRYING OUT THE INVENTION

First Embodiment

Figure 1:
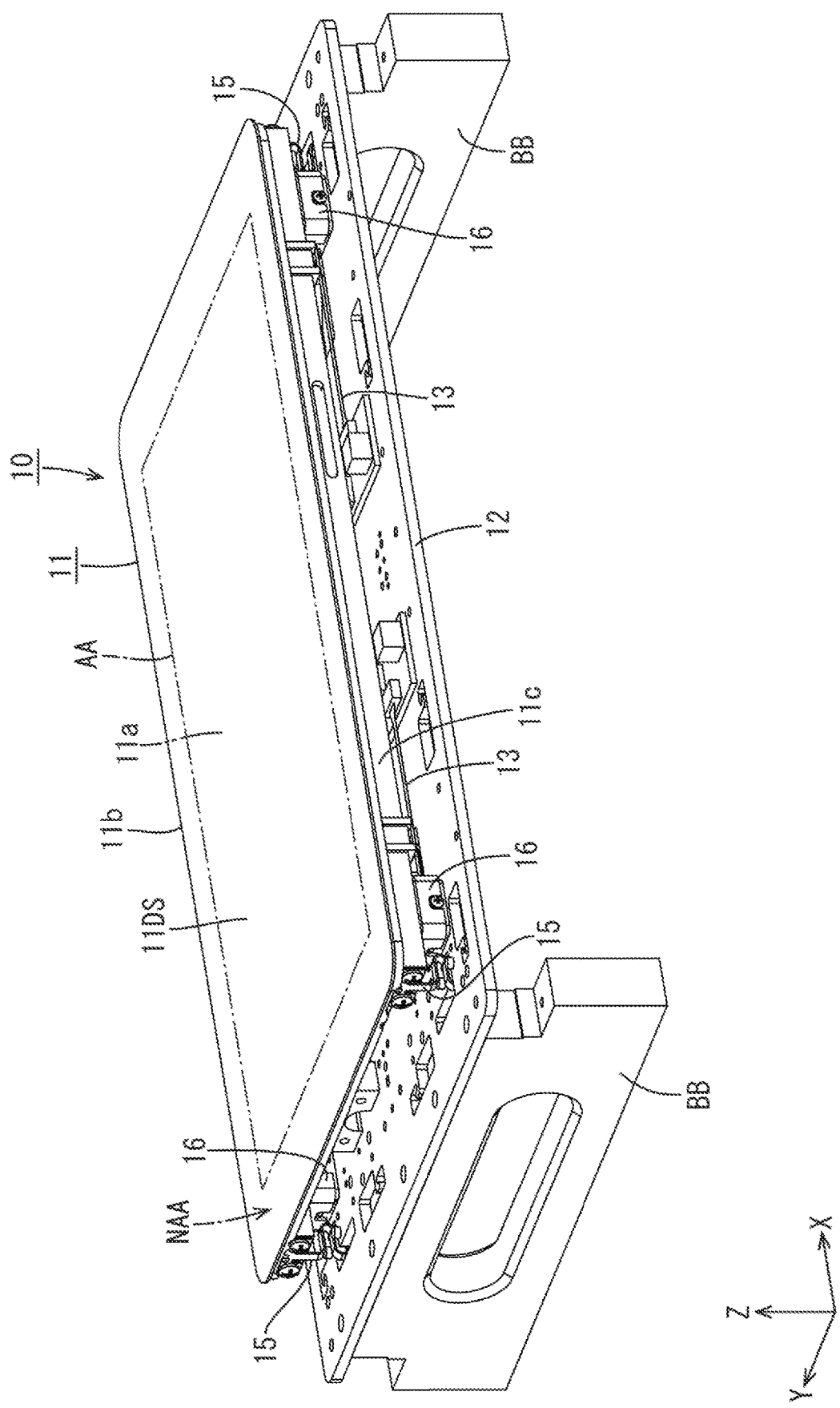
FIG. 1 is a perspective view of an input device according to a first embodiment of the present invention.

The first embodiment of the present invention will be described with reference to FIGS. 1 to 11. This embodiment will exemplify an input device 10 having a haptic feedback function (tactile sensitivity feedback function). X-axes, Y-axes, and Z-axes may be present in the drawings. The axes in each drawing correspond to the respective axes in other drawings. A vertical direction is defined with reference to FIGS. 4, 5, 6, 10, and 11 and an upper side and a lower side in the drawings correspond to a front side and a backside of the liquid crystal panel, respectively.

As illustrated in FIG. 1, the input device 10 at least includes a liquid crystal display device (input member) 11 where an image is displayed and a pressing operation performed by the user is input and a base member 12 where the liquid crystal display device 11 is mounted. The liquid crystal display device 11 has a touch panel function (a position input function) of detecting a pressing position (an input position) designated by the user in addition to a display function of displaying an image. The present embodiment will exemplify the input device 10 used for a car navigation system mounted on a vehicle, specific applications of the embodiment can be altered as appropriate.

Figure 11:
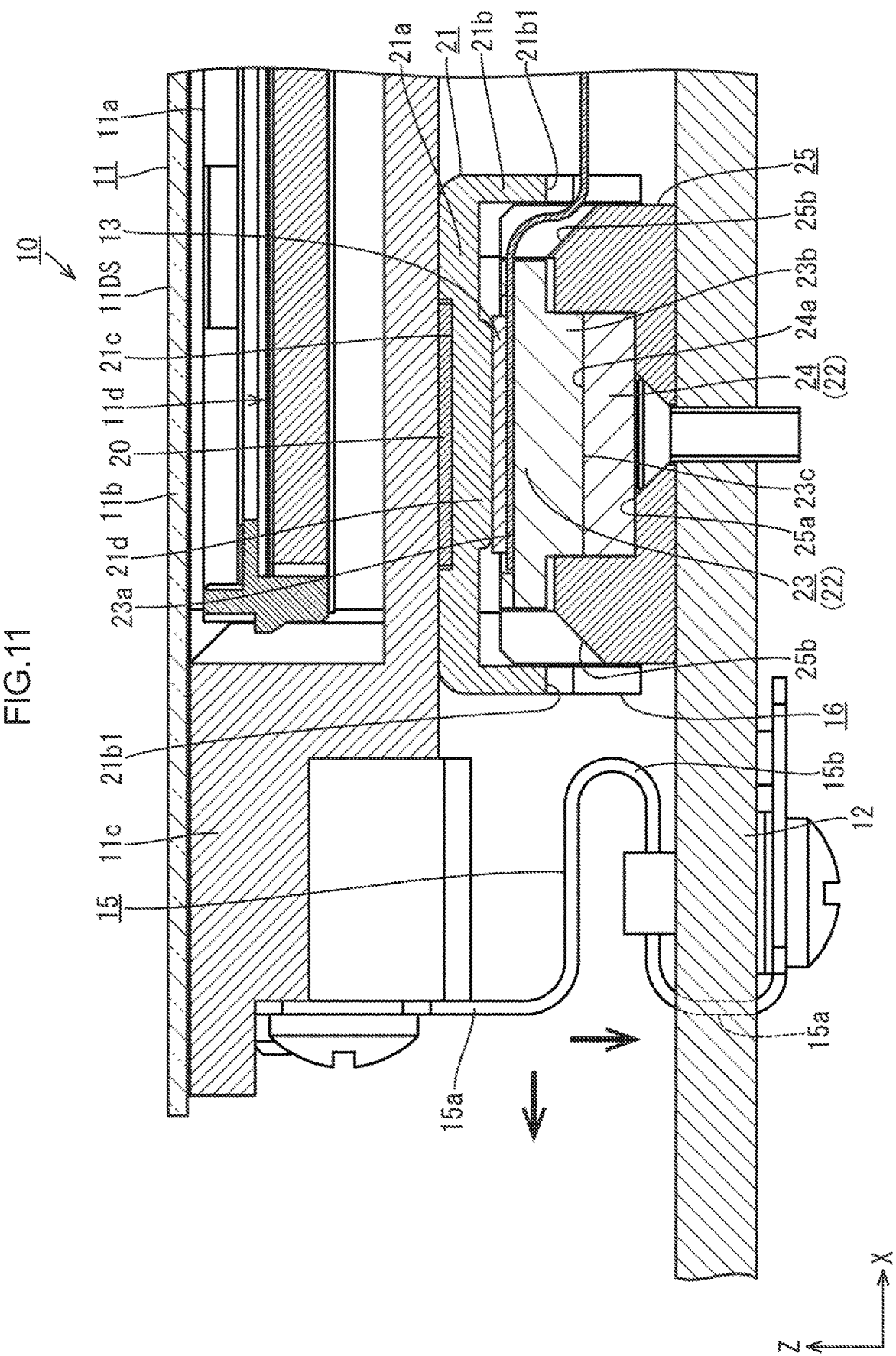
FIG. 11 is a side sectional view of the pressure sensor unit and base member included in the input device.

As illustrated in FIGS. 1 and 11, the liquid crystal display device 11 at least includes a liquid crystal panel 11a (a display panel) on which an image is displayed, a backlight device 11d, a cover glass 11b (a cover panel, panel protecting member), a casing 11c. The backlight device 11d is disposed on the back side relative to the liquid crystal panel 11a (on an opposite side from the input side of a pressing operation) and configured to supply light used for display on the liquid crystal panel 11a. The cover glass 11a is disposed to overlap the liquid crystal panel 11a on the front side thereof. The liquid crystal panel 11a and the backlight device 11d are arranged in the casing 11c. The liquid crystal panel 11a at least includes a pair of substrates, a liquid crystal layer, and a pair of polarizing plates (the substrates and the liquid crystal layer are not illustrated). The substrates are made of a substantially transparent material, for example, glass and bonded to each other such that their inner surfaces face each other while having a predetermined interval (a cell gap) therebetween. The liquid crystal layer is sealed between the substrates. The polarizing plates are respectively disposed on the outer surfaces of the substrates. Out of the pair of substrates, a CF substrate (a counter substrate) disposed on the front side includes components such as an alignment film in addition to a color filter having color portions such as R (red), C (green), and B (blue) portions arranged in a predetermined arrangement and a light blocking portion (a black matrix) defining each of the adjacent color portions. On the other hand, an array substrate (a TFT substrate) disposed on the back side includes components Such as switching elements (for example, TFTs) connected to source lines and gate lines that are perpendicular to each other, pixel electrodes connected to the switching elements, and an alignment film.

Figure 3:
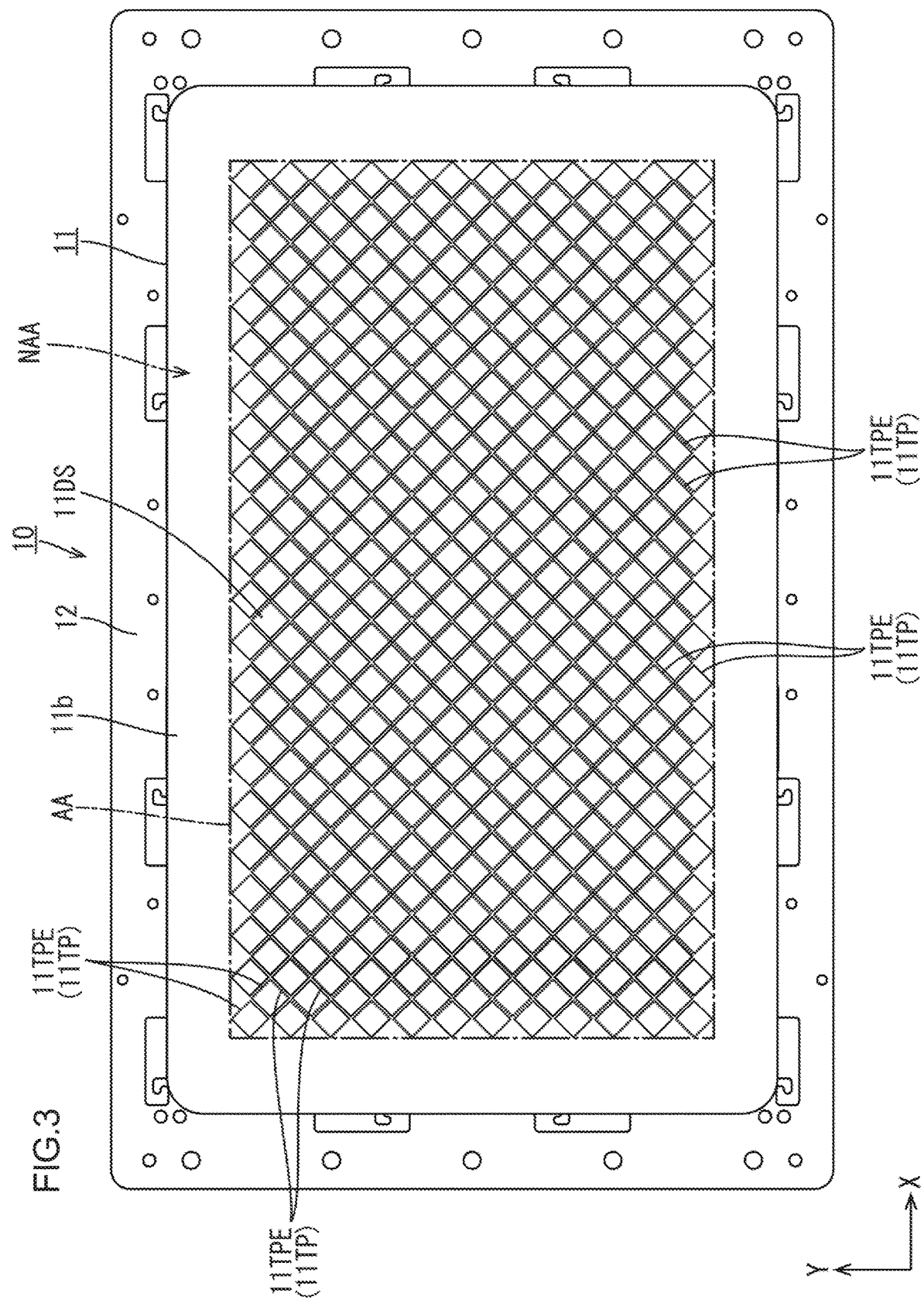
FIG. 3 is a plan view of the input device.

As illustrated in FIG. 3, the liquid crystal panel 11a has a horizontally long rectangular plan view shape and includes a display surface 11DS that is divided into a display area AA (an active area) on which an image is displayed and a non-display area NAA (non-active area) having a frame shape (frame-like shape) surrounding the display area AA. A long-side direction and a short-side direction of the liquid crystal panel 11a correspond to the X-axis direction and the Y-axis direction in each drawing, respectively and a normal direction of the display surface 11DS corresponds to the Z-axis direction in each drawing. In FIG. 3, a chain line represents an outline of the display area AA, and an area outside the chain line is the non-display area NAA. The liquid crystal panel 11a includes a touch panel pattern 11TP for detecting the pressing position where the user has performed a pressing operation. The touch panel pattern 11TP is based on the so-called projected capacitive type and a detection method thereof is, for example, a self-capacitance method. The touch panel pattern 11TP includes at least touch electrodes 11TPE (position detection electrodes) arranged side by side in a matrix pattern in the display area AA. Accordingly, the display area AA of the liquid crystal panel 11a substantially matches a touch area where a pressing position can be detected, and the non-display area NAA substantially matches a non-touch area where a pressinq position cannot be detected. When the user inputs a pressing operation with his/her finger on the basis of an image that is displayed on the display area AA and visually recognized by the user, a capacitance is created between the finger and the touch electrode 11TPE. This causes a change capacitance detected by the touch electrode 11TPE located near finger according to the approach of the finger to the touch electrode 11TPE. The capacitance differs from capacitances of the touch electrodes 11TPE located far from the finger. Thus, the pressing position can be detected.

As illustrated in FIG. 1, the cover glass 11b has a horizontally long rectangular shape that is slightly larger than the liquid crystal panel 11a and is configured to protect the liquid crystal panel 11a by covering a substantially entire area of the liquid crystal panel 11a from the front side. The cover glass 11b is made of substantially transparent glass material having high transmissivity and is preferably made of reinforced glass. As the reinforced glass used for the cover glass 11b, it is preferable to use, for example, a chemically reinforced glass material having a chemically reinforced layer formed on the surface by applying a chemically reinforcing process to the sur face of a late-like glass base material. However, it is not limited thereto. The casing 11c has a substantially box-like shape opening to the front side and includes an accommodation space therein where the liquid crystal panel 11a and the backlight device 11d are arranged.

As illustrated in FIGS. 1 and 3, the base member 12 is a plate member having a horizontally long quadrangular plan view shape and is fixed to base blocks BB mounted on a dashboard (not illustrated) of a vehicle base blocks BB are disposed to over a pair of short side portions of the outer edge portions of the base member 12, respectively, and are provided so as to protrude from mount surface of the dashboard toward the front side. The base member 12 is slightly larger than the liquid crystal display device 11 in a plan view and includes holes (thread holes) for the attachment of various types of components (the pressure sensors 13, the actuators 14, the elastic members and the like) in a plate surface thereof. The base blocks BB described above are not required if the base member 12 can be fixed directly the dashboard.

Figure 2:
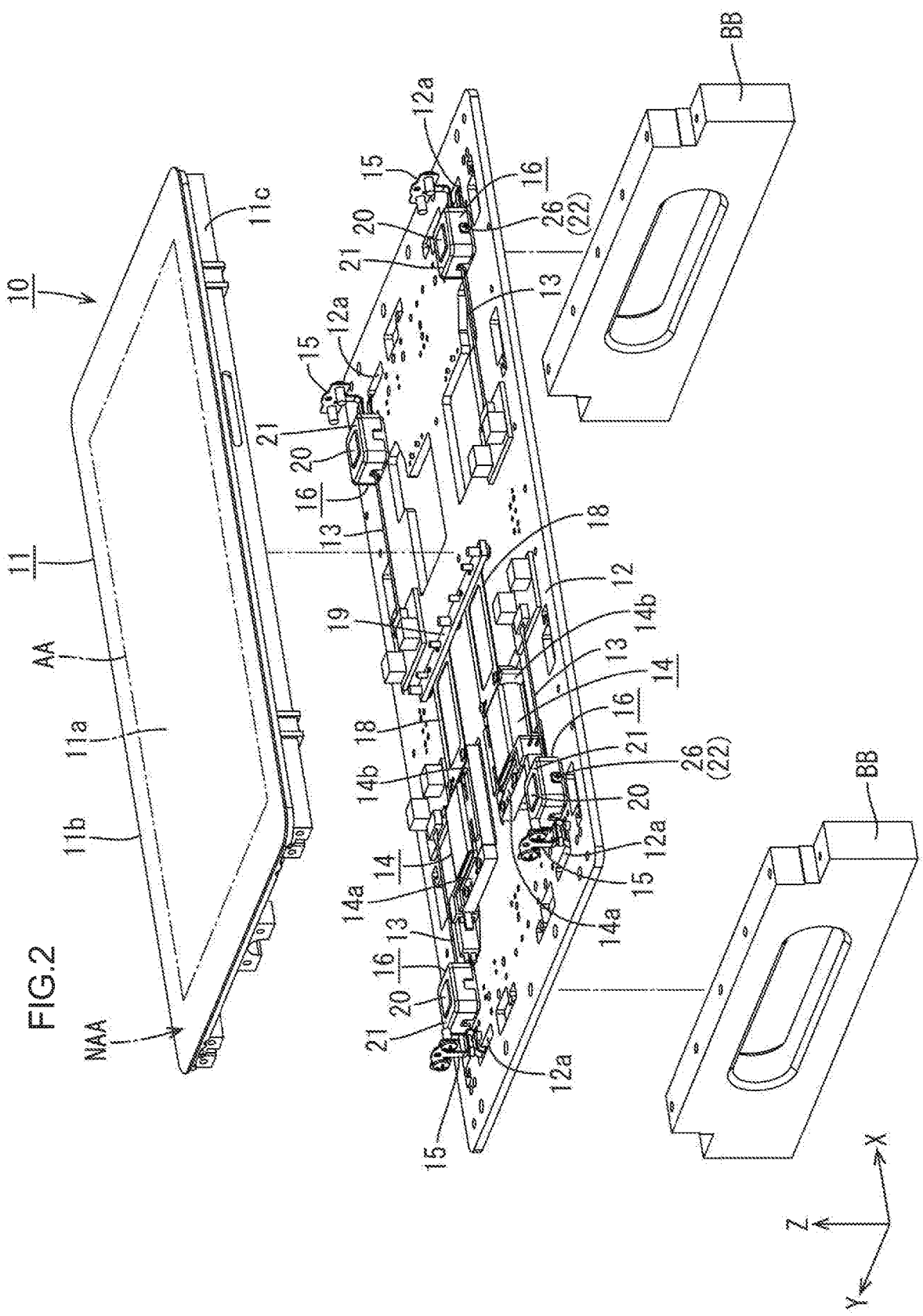
FIG. 2 is an exploded perspective view of the input device.

As illustrated in FIG. 2, the pressure sensors (pressure-sensitive sensors) 13, the actuators 14, and the elastic members 15 are at least mounted on the base member 12. The pressure sensors 13 detect the pressure that operates the liquid crystal display device 11 according to a pressing operation. The actuators 14 vibrate the liquid crystal display device 11. The elastic members 15 elastically support the liquid crystal display device 11 such that the liquid crystal display device 11 can move relative to the base member 12. A predetermined space is maintained with respect to the Z-axis direction between the liquid crystal display device 11 supported by the elastic members 15 and the base member 12.

Figure 9:
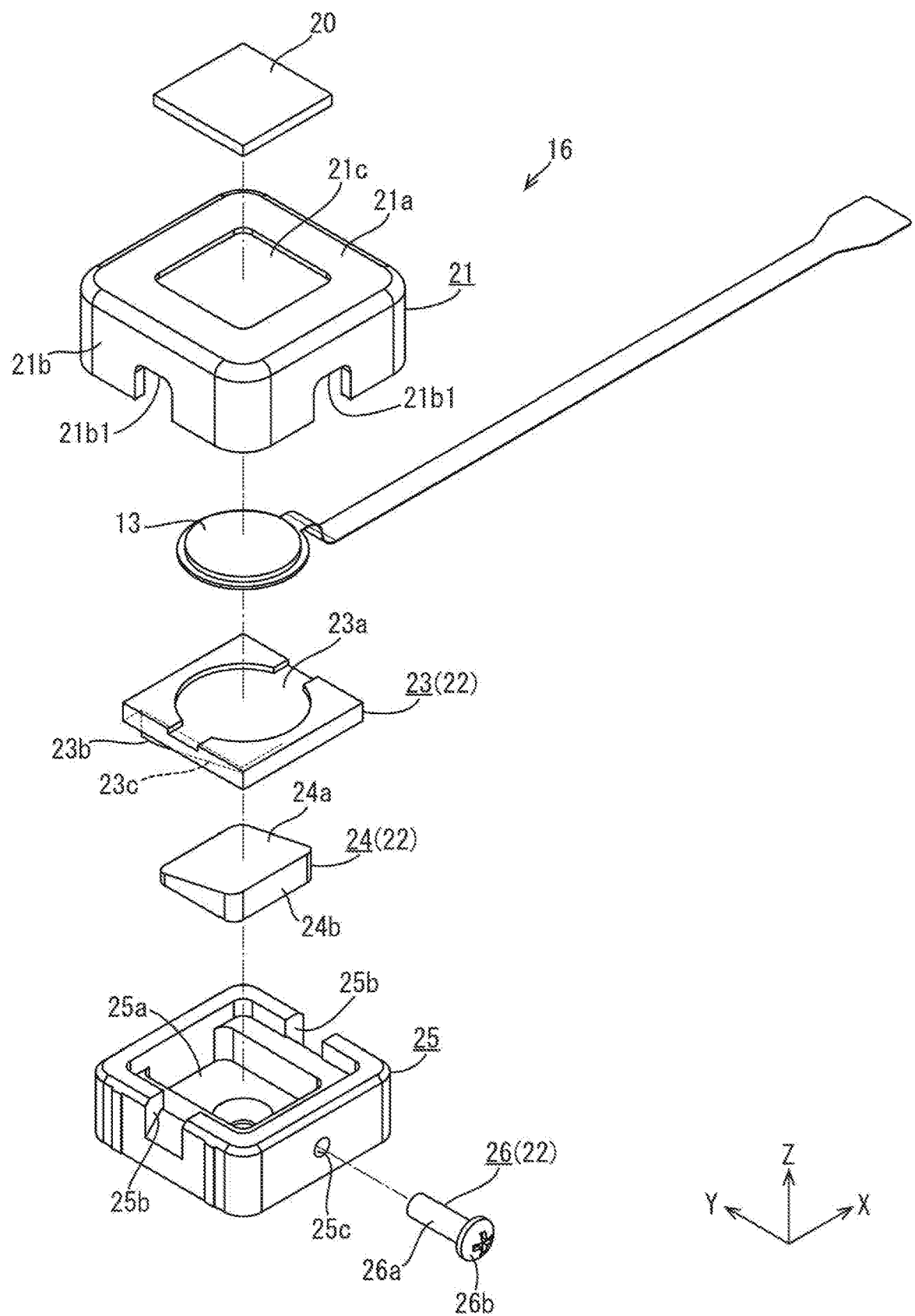
FIG. 9 is an exploded perspective view of the pressure sensor unit included in the input device.

As illustrated in FIGS. 9 and 11, the pressure sensors 13 are so-called pressure-sensitive ink sensors. Each pressure sensor 13 at least includes a pair of films and pressure-sensitive electrodes (not illustrated). The films are made of an insulating material and bonded to each other. The pressure-sensitive electrodes are disposed on inner surfaces of the films to be opposed to each other. A contact resistance between a pair of opposed pressure-sensitive electrodes is changed according to the pressure that operates the pressure sensor 13 in the thickness direction (the Z-axis direction). The pressure sensor 13 can detect pressure by utilizing such a change in the contact resistance. The pressure-sensitive electrodes are formed by, for example, printing pressure-sensitive ink on the film. Each pressure sensor 13 extends along the X-axis direction in a belt-like shape. Each pressure sensor 13 includes one end portion mounted in a pressure sensor unit that is fixed to the base member 12 and the one end portion has a substantially circular plan view shape. The pressure sensor 13 extends outside the pressure sensor unit and includes another end portion that is outside the pressure sensor unit 16 and connected to a controller via a connector (not illustrated). The pressure sensor units 16 will be described in detail later. The four pressure sensors 13 and the four pressure sensor units 16 are respectively arranged near the four corners of the base member 12 and the liquid crystal display device 11.

Figure 6:
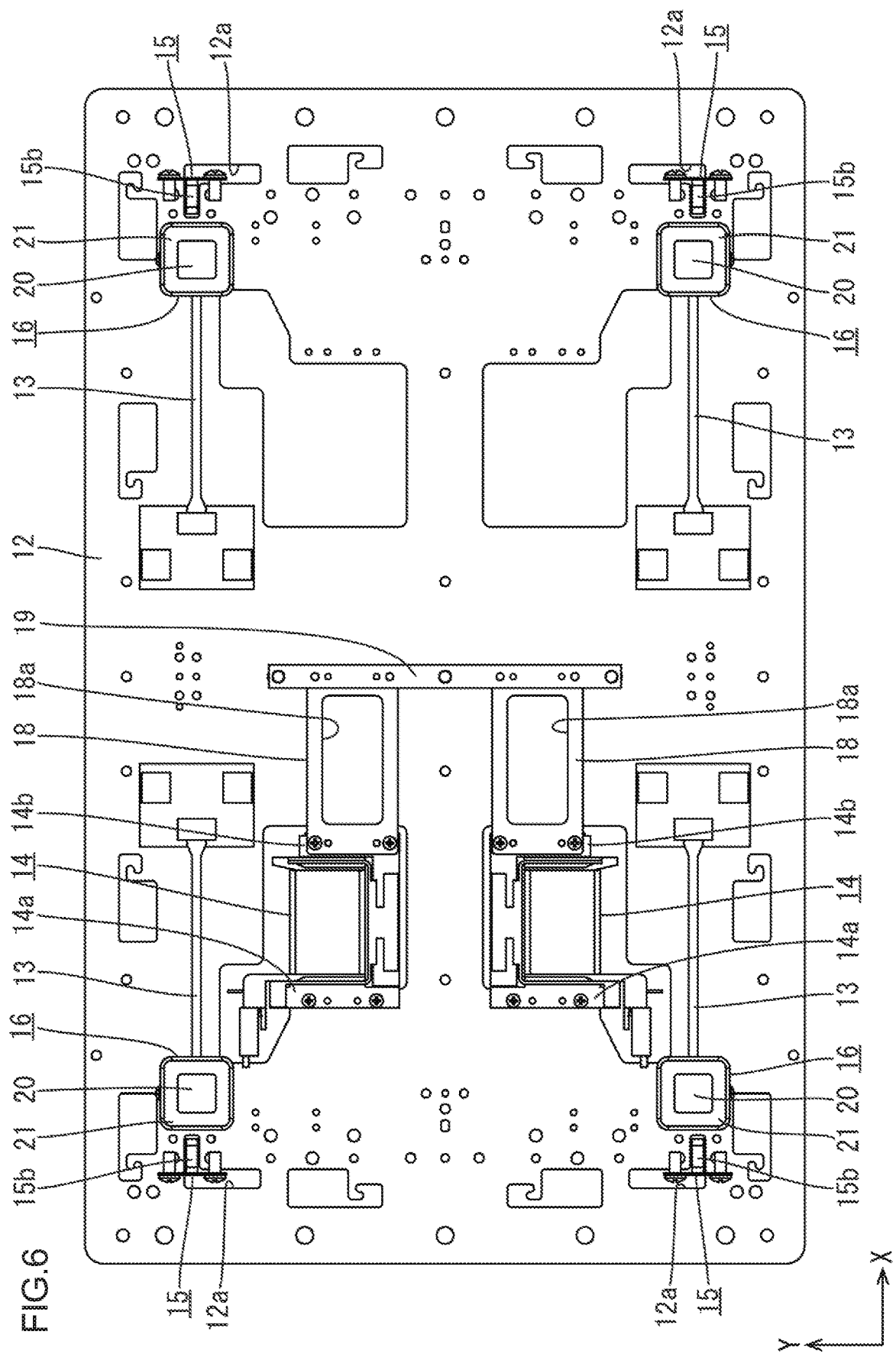
FIG. 6 is a plan view of a base member included in the input device.

As illustrated in FIGS. 2 and 6, each actuator is a so-called electromagnetic actuator (a solenoid actuator). Each actuator 14 includes a fixed portion 14a attached to the base member 12 and a movable portion 14b that is attached to the liquid crystal display device 11 and is movable relatively to the fixed portion 14a in the X-axis direction (a vibrating direction). Although not illustrated, each fixed portion 14a at least includes a fixed magnetic pole and a coil wound around the fixed magnetic pole. Each movable portion 14b at least has a movable magnetic pole (not illustrate) that is movable relatively to the fixed magnetic pole. In the actuator 14, the movable magnetic pole is attracted to the fixed magnetic pole by a magnetic field that is created in the fixed magnetic pole by current supply to the coil. Accordingly, the movable portion 14b is moved closer to the fixed portion 14a in the X-axis direction. Thus, the liquid crystal display device 11, to which the movable portion 14b is fixed, can be vibrated with respect to the base member 12, to which the fixed portion 14a fixed, along X-axis direction (a direction perpendicular to the pressing direction of the pressing operation). The fixed portion 14a of the actuator 14 is fixed to the base member 12 with a screw member. The movable portion 14b of the actuator 14 is fixed with a screw member to a leaf spring member 18 extending along the X-axis direction. The leaf spring member 18 is a flat plate member made of a metal (for example, stainless steel) and has a plate surface thereof that is parallel to a display surface 11DS of the liquid crystal display device 11 and a plate surface of the base member 12. The leaf spring member 18 can elastically deform in the Z-axis direction (the pressing direction) that is a normal direction of the plate surface of the leaf spring member 18. The leaf spring member 18 includes one end portion and another end portion with respect to the X-axis direction. The one end portion is fixed to the movable portion 14b with a screw member and the other end portion is fixed to a block-shaped movable side bracket 19 with a screw member. The block-shaped movable side bracket 19 is fixed to the casing 11c of the liquid crystal display device 11. Accordingly, the leaf spring member 18 is configured to elastically deform in a cantilever manner with the one end portion thereof being fixed to the movable portion 14b as a fulcrum point. The other end portion can be relatively displaced along the Z-axis direction according to the elastic deformation. Each leaf spring member 18 has a hole 18a in a middle portion between two end portions thereof. The two end portions are fixed to the movable portion 14b and the movable side bracket 19, respectively. Accordingly, the leaf spring member 18 includes a pair of strip portions in the middle portion. Since the liquid crystal display device 11 is fixed to the other end portion of the leaf spring member 18 via the movable side bracket 19, the liquid crystal display device 11 can be moved relatively in the Z-axis direction according to the elastic deformation of the leaf spring member 18.

As illustrated in FIGS. 2, and 4 to 6, the actuators 14 are disposed on an inner side (closer to a middle portion) of the liquid crystal display device 11 than the pressure sensors 13, the pressure sensor units 16, and the elastic members 15 (which will be described later) that are arranged on the base member 12 and near the four corners of the liquid crystal display device 11, as described above. More specifically, in this embodiment, the pair of actuators 14 are arranged side by side at an interval in the Y-axis direction. The pair of actuators 14 are aligned with each other with respect to the X-axis direction, and the movable side bracket 19 extending along the Y-axis direction and extending between the pair of leaf spring members 18 is fixed to the other end portions of the pair of leaf spring members 18 that are respectively fixed to the pair of movable portions 14b. The pair of actuators 14 are arranged on a portion of the plate surface of the base member 12 between the pair of pressure sensor units 16 illustrated in FIG. 5 with respect to the short side direction (the Y-axis direction) of the liquid crystal display device 11 and next to the left side pressure sensor 13 in FIG. 4 and on a center side with respect to the long side direction (the X-axis direction) of the liquid crystal display device 11. Accordingly, the pair of actuators 14 are arranged so as to be surrounded by the four pressure sensors 13 and the four pressure sensor units 16 (the elastic members 15) arranged near the four corners of the liquid crystal display device 11, respectively. The pair of actuators 14 are arranged with respect to the X-axis direction such that the movable side bracket 19 fixed to the other end portions of the leaf spring members 18 is mounted in a substantially central portion of the liquid crystal display device 11 with respect to the X-axis direction. Accordingly, vibrations in the X-axis direction created in the movable portions 14b according to the oscillations of the pair of actuators 14 are transmitted to the substantially central portion of the display surface 11DS of the liquid crystal display device 11 via the leaf spring members 18 and the movable side brackets 19.

Figure 7:
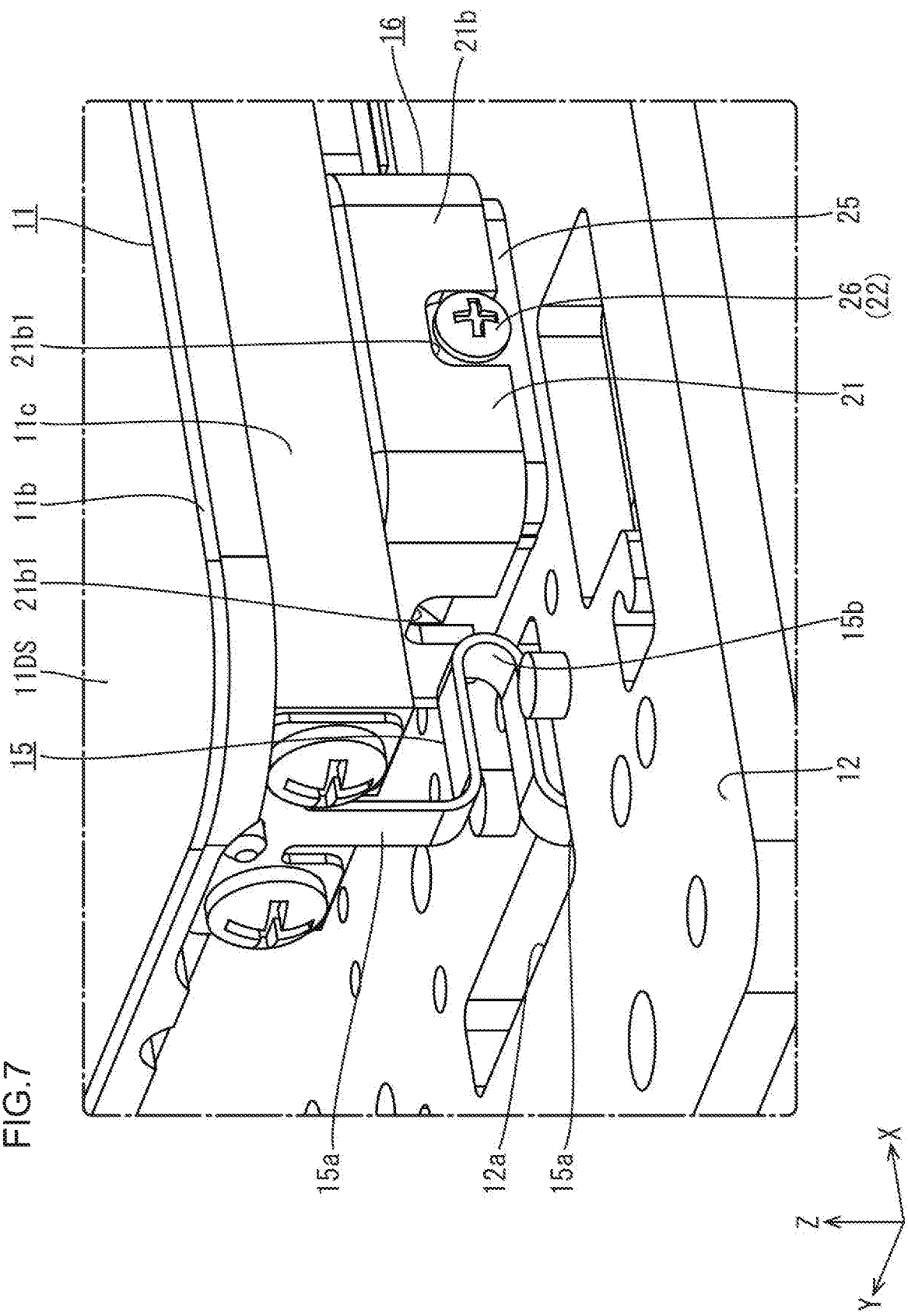
FIG. 7 is an enlarged perspective view of an elastic member included in the input device and therearound.

Each of the elastic members 15 is formed by pressing a metal plate and supports the liquid crystal display device 11 in a position spaced apart from the base member 12 on the front side with respect to the Z-axis direction, as illustrated in FIG. 1. As illustrated in FIGS. 7 and 11, the elastic member 15 includes a pair of first spring portions 15a extending along substantially the Z-axis direction (the pressing direction) and a second spring portion 15b that extends continuously from the pair of first spring portions 15a along substantially the X-axis direction (a direction crossing the pressing direction) and is curved. The pair of first spring portions 15a include one disposed on the front side in the Z-axis direction and another one disposed on the back side. One end portion of the first spring portion 15a on the front side is fixed to the liquid crystal display device 11. One end portion of the first spring portion 15a on the back side is fixed to the base member 12. The one end portion of the first spring portion 15a has a wide shape and is fixed to the outer surface of the casing 11c of the liquid crystal display device 11 with two screw members. The first spring portion 15a on the back side extends to the back surface side of the base member 12 through a hole 12a formed in the base member 12 and is bent such chat the one end portion of the first spring portion 15a on the back side extends in parallel to the back surface of the base member 12. The parallel extending portion is fixed to the base member 12 with a screw member. In this manner, the first spring portion 15a on the back side extends through the base member 12. Accordingly, creepage distance of the elastic member 15 becomes longer by about the thickness dimension of the base member 12 than that of an elastic member disposed by using only the space between the liquid crystal display device 11 and the base member 12. The pair of first spring portions 15a are configured to elastically deform in a cantilever manner with respect to the X-axis direction (a vibrating direction) with the attachment positions thereof on the liquid crystal display device 11 and the base member 12 as fulcrum points. The second spring portion 15b has a laid "U" spa in a side view and the two end portions thereof are continuous to the other end portions of the pair of fir spring portions 15a. The second spring portion 15b extends continuously from the pair of first spring portions 15a along the X-axis direction toward the inner side (the center side) of the liquid crystal display device 11 and is curved. The second spring portion 15b is configured to elastically deform with respect to the Z-axis direction with the curved portion as a fulcrum point. In this manner, each elastic member 15 is configured to elastically deform in both the X-axis direction and the Z-axis direction, thus supporting the liquid crystal display device 11 so as to be elastically displaced relative to the base member 12 in the X-axis direction and the Z-axis direction.

Figure 4:
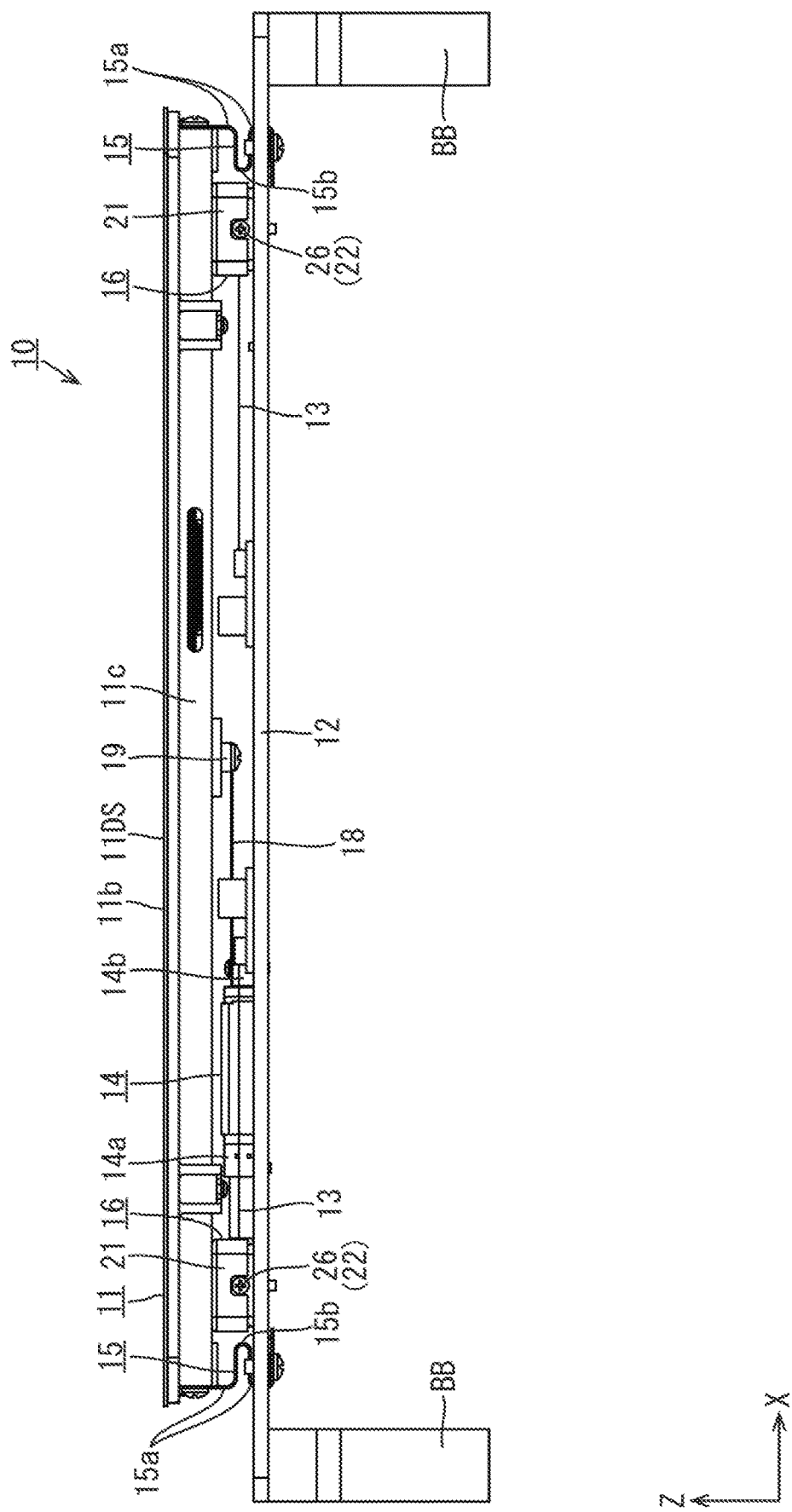
FIG. 4 is a side view of the input device.
Figure 5:
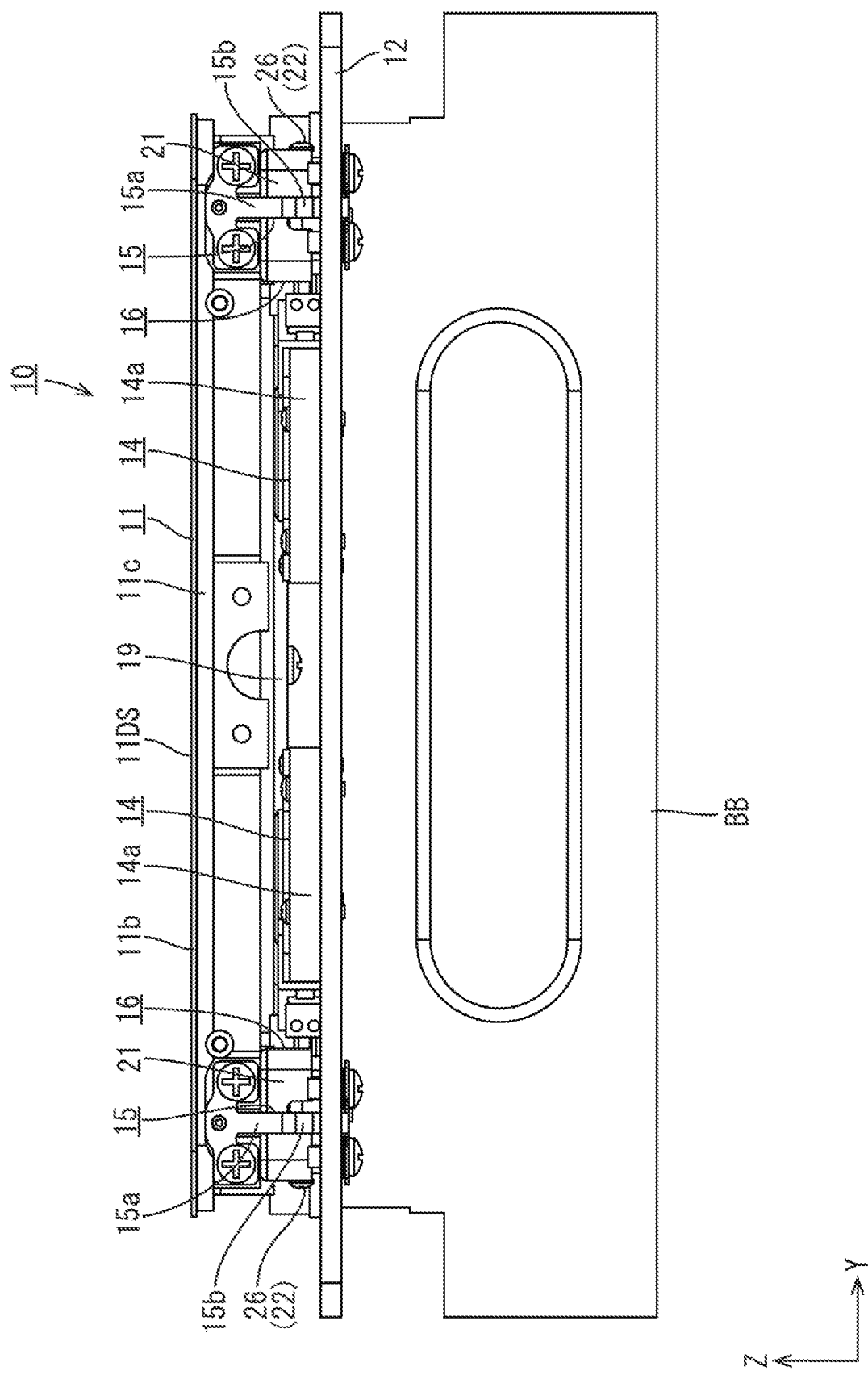
FIG. 5 is a front view of the input device.

As illustrated in FIGS. 2, 4, and 5, the four elastic members 15 are respectively arranged near the four corners of the liquid crystal display device 11 and the base member 12. The elastic members 15 are arranged outside the pressure sensors 13 and the pressure sensor units 16, which are arranged similarly near the four corners of the liquid crystal display device 11 and the base member 12, with respect to the X-axis direction. Each of the four elastic members 15 is arranged such that the second spring portion 15b protrudes inward relative to the first spring portions 15a and is closer to the pressure sensor 13 and the pressure sensor units 16.

Figure 10:
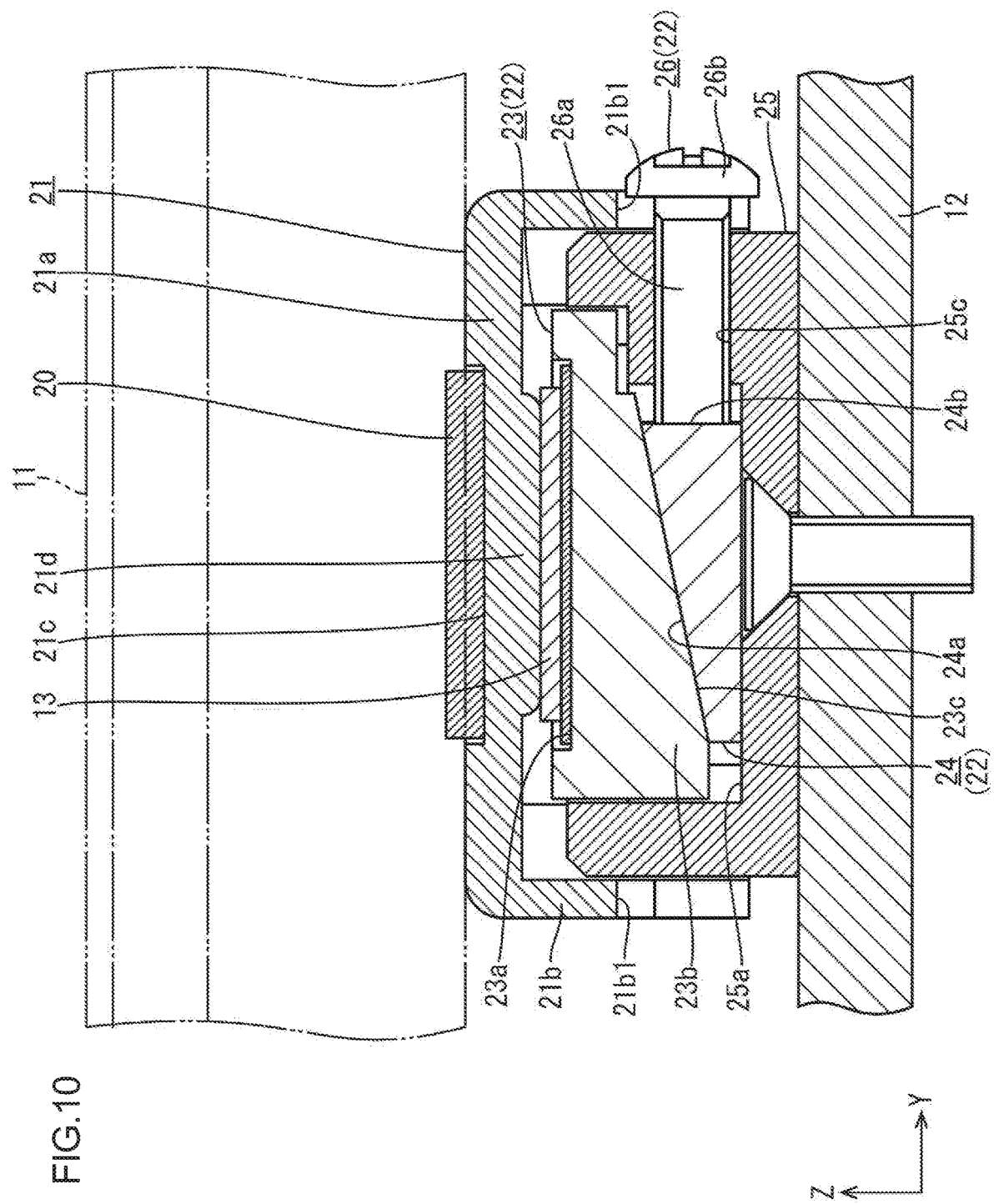
FIG. 10 is a front sectional view of the pressure sensor unit and base member included in the input device.

As illustrated in FIGS. 9 to 11, the input device 10 according to this embodiment includes braking members 20 arranged in contact with the liquid crystal display device 11, holding members 21 (pressure sensor covers) disposed on the base member 12 to hold the braking members 20, and position adjusting mechanisms 22 that adjust the position of at least one of the liquid crystal display device 11 and the base member 12 in the pressing direction. In the present embodiment, the braking members 20, the holding members 21, and the position adjusting mechanisms 22 are respectively integrated in the pressure sensor units 16 each having the following configuration. Referring to FIG. 10, the liquid crystal display device 11 is indicated by the two-dot chain lines.

As illustrated in FIG. 9, each pressure sensor unit 16 includes the braking member 20 that is in direct contact the liquid crystal display device 11, the holding member 21 that holds the braking member 20, the pressure sensor 13, a sensor holding member 23 (sensor holder) that holds the pressure sensor 13, a position adjusting spacer 24 disposed on the back side of the sensor holding member 23, a case 25 accommodating the above members, and a position adjusting screw 26 that moves the position adjusting spacer 24. Out of the components, the sensor holding member 23, the position adjusting spacer 24, and the position adjusting screw 26 are configured as the position adjusting mechanism 22. As illustrated in FIGS. 4 to 6, the four pressure sensor units 16 are respectively arranged near the four corners of the liquid crystal display device 11 and the base member 12 and respectively arranged next to the four elastic members 15 with respect to the X-axis direction and closer to the middle side of the liquid crystal display device 11 and the base member 12 than the elastic members 15 are.

As illustrated in FIG. 9, each braking member 20 has a sheet-like shape having a quadrangular plan view shape and a predetermined thickness. The braking member 20 is made of a high friction material (such as a woven-based friction material and a mold-based friction material) and has a higher frictional coefficient than the holding member (a member disposed between the liquid crystal display device 11 and the pressure sensor 13), which will described later. Each holding member 21 includes a main portion 21a disposed between the braking member 20 and the pressure sensor 13 and a tubular portion 21b protruding from an outer peripheral edge of the main portion 21a toward the back side. The holding member 21 has a cap-like shape as a whole so as to be fitted on the case 25. A braking member arrangement recess 21c is formed on the front side surface of the main portion 21a of the holding member 21 (the surface facing the liquid crystal display device 11 and the braking member 20). The braking member 20 is arranged in the braking member arrangement recess 21c. As illustrated in FIG. 10, a sensor contact projection 21d that is in contact with the pressure sensor 13 is formed to project from the back side surface of the main portion 21a of the holding member 21 (the surface facing the pressure sensor 13) toward the back side. The main portion 21a of the holding member 21 is sandwiched between the braking member 20 and the pressure sensor 13 so as to support the braking member 20 from the back side and press the pressure sensor from the front side. The tubular portion 21b of the holding member 21 has a square tubular shape and is disposed to surround the case 25 from the outer peripheral side. The tubular portion 21b includes notches 21b1 through which the pressure sensor 13 and the position adjusting screw 26 pass. The notches 21b1 are respectively provided in the four side portions of the tubular portion 21b.

As illustrated in FIG. 9, each sensor holding member 23 has a quadrangular plate-like plan view shape and is arranged in the case 25 so as to be disposed between the pressure sensor 13 and the position adjusting spacer 24, which will be described later. The sensor holding member 23 includes a sensor arrangement recess 23a on the front side surface thereof (the surface facing the pressure sensor 13 and the holding member 21) and the pressure sensor 13 is arranged in the arrangement recess 23a. As illustrated in FIG. 10, the sensor holding member 23 includes a projection 23b on the back side surface thereof (the surface facing the position adjusting spacer 24) and the projection 23b projects toward the back side along the Z-axis direction. The projection 23b has a first inclined surface 23c on a projected distal end surface (a back side surface) thereof and the first inclined surface 23c is inclined with respect to the Z-axis direction and the Y-axis direction. The first inclined surface 23c has a flat surface and is inclined (upwardly) so as to extend from an opposite side from the position adjusting screw 26 (which will be described later) toward the position adjusting screw 26 while being inclined upward to be closer to the pressure sensor 13 with respect to the Z-axis direction.

As illustrated in FIG. 9, each position adjusting spacer 24 has a quadrangular plate-like plan view shape and is arranged in the case 25 so as to be disposed on the back side of the sensor holding member 23. The position adjusting spacer 24 has an outline one size smaller than the outline of the sensor holding member 23 and almost equal to the outline of the projection 23b. The position adjusting spacer 24 has a back side surface that is a substantially flat surface and a front side surface (the surface facing the sensor holding member 23 that is a second inclined surface 24a inclined with respect to both the Z-axis direction and the Y-axis direction. As illustrated in FIG. 10, the second inclined surface 24a is a flat surface that is parallel to the first inclined surface 23c described above. The second inclined surface 24a inclined (downward) from a position adjusting screw 26 side toward an opposite side from the position adjusting screw 26 with respect to the Y-axis direction so as to be farther away from the pressure sensor 13 with respect to the Z-axis direction. When the sensor holding member 23 and the position adjusting spacer 24 are arranged in the case 25, the first inclined surface 23c and the second inclined surface 24a are contacted with each other and the sensor arrangement recess 23a and the pressure sensor 13 arranged therein are maintained in a horizontal position. The outer peripheral surface of the position adjusting spacer 24 includes a position adjusting screw 26 side surface with respect to the Y-axis direction. An area of the position adjusting screw 26 side surface in the Z-axis direction is larger than that of an opposite side surface opposite from the position adjusting screw 26 side surface. The position adjusting screw 26 side surface is a screw contact surface 24b that is contacted with a distal end surface of the position adjusting screw 26.

As illustrated in FIG. 9, the case 25 has a substantially box shape opening to front side and includes an arrangement recess 25a where the position adjusting spacer 24, the sensor holding member 23, and the pressure sensor 13 are arranged while being overlapped in sequence. The arrangement recess 25a includes two bottom surfaces having different levels to have a step. The two bottom surfaces include a relatively low bottom surface that supports the position adjusting spacer 24 from the back side and a relatively high bottom surface that supports the sensor holding member 23 from the back side. The arrangement recess 25a has a size in the Y-axis direction larger than that of the position adjusting spacer 24 so that the position adjusting spacer 24 is movable relatively to the case 25 with respect to the Y-axis direction. As illustrated in FIGS. 9 to 11, the case 25 includes a pair of notches 25b in portions of the outer peripheral side wall so as to be communicated with some of the four notches 21b1 of the holding member 21. The other end portion of the pressure sensor 13 extends through the notches 21b1, 25b that are communicated with each other to the outside. As illustrated in FIGS. 9 and 10, a screw insertion hole 25c through which the position adjusting screw 26 is inserted is formed through portion of the outer peripheral side wall of the case where no notch 25b is formed. The screw insertion hole 25c is formed opposite the screw contact surface 24b of the position adjusting spacer 24 that arranged in the arrangement recess 24a.

As illustrated in FIGS. 9 and 10, the position adjusting screw 26 includes a shaft portion 26a having an axial line parallel to the Y-axis direction and a head portion 26b included at one end of the shaft portion 26a. The shaft portion 26a has spiral threads, which are not illustrated, on an outer peripheral surface thereof. When the position adjusting screw inserted through the screw insertion hole 25c of the case 25 and tightened, the position adjusting screw 26 moves forward and toward the left side FIG. 10 along the Y-axis direction that is the axial direction of the shaft portion 16a. When the position adjusting screw 26 is loosened in an opposite direction, the position adjusting screw 26 is moved back and toward the right side in FIG. 10 along the Y-axis direction. If the position adjusting screw 26 is moved forward, the position adjusting spacer slides (moves) to the left side in FIG. 10 along the Y-axis direction. Accordingly, an upward force in the Z-axis direction is transmitted from the second inclined surface 24a to the first inclined surface 23c of the sensor holding member 23 such that a force of approaching the liquid crystal display device 11 acts on the first inclined surface 23c. Accordingly, the sensor holding member 23 and the holding member 21 can be relatively moved closer to the liquid crystal display device 11 with respect to the Z-axis direction. If the position adjusting screw 26 moves backward, a downward force along the Z-axis direction that is transmitted from the sensor holding member 23 to the position adjusting spacer 24 is converted by the first inclined surface 23c and the second inclined surface 24a such that the position adjusting spacer 24 slides to the right side in FIG. 10 along the Y-axis direction.

Accordingly, the sensor holding member 23 and the holding member 21 move downward in the Z-axis direction and relatively move to be farther away from the liquid crystal display device 11. As described above, the position of the holding member 21 can be adjusted in the Z-axis direction with respect to the liquid crystal display device operating the position adjusting screw 2b.

Figure 8:
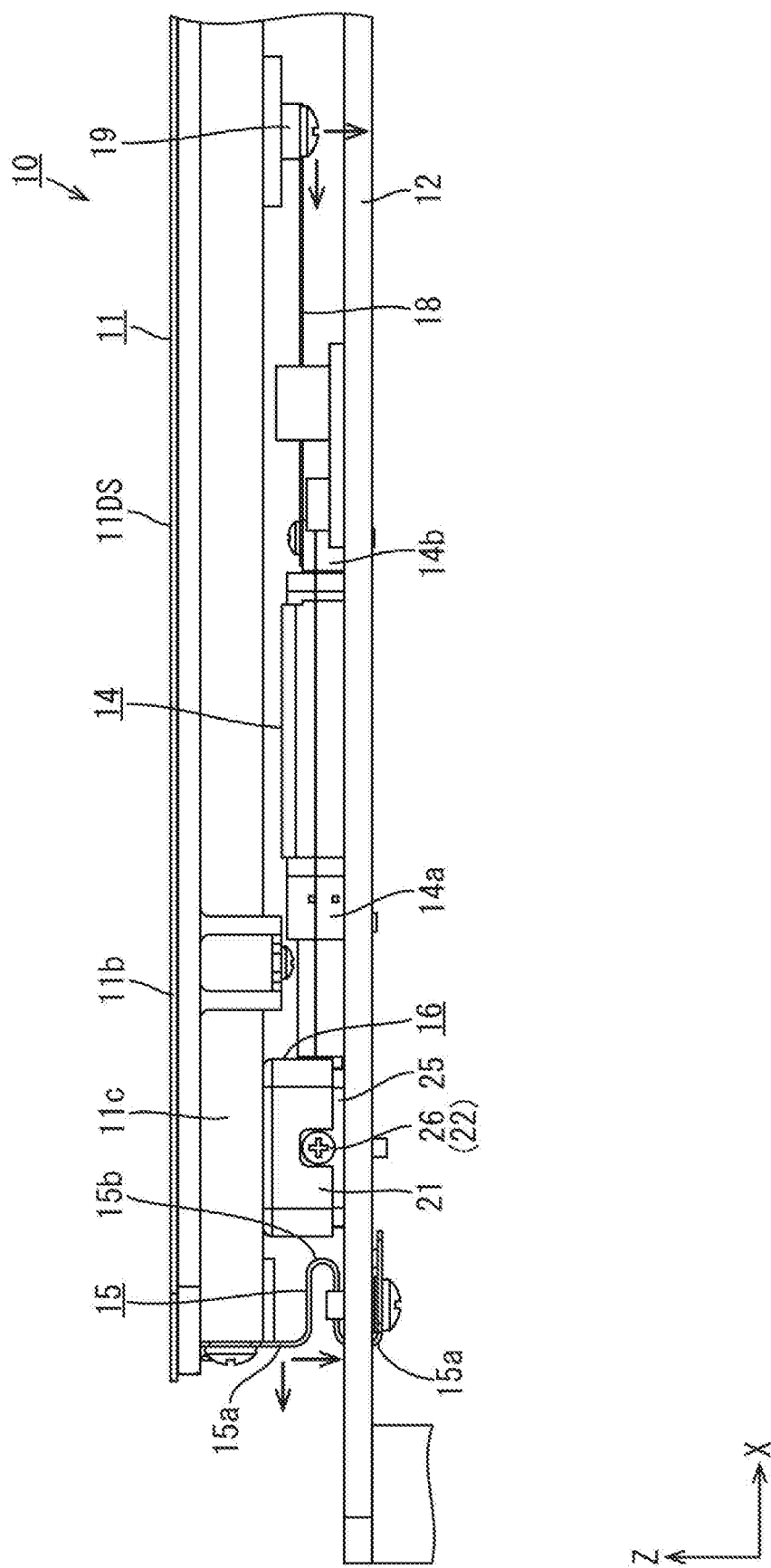
FIG. 8 is an enlarged side view of the elastic member, a pressure sensor unit, and an actuator included in the input device and therearound.

The present embodiment includes the above-described configuration and operations thereof will described next. If a user presses the surface of the cover glass 11b to press down the display surface 11DS of the liquid crystal display device 11 within a surface area thereof, as illustrated in FIGS. 7 and 8, the second spring portion 15b of the elastic member 15 that is fixed to the liquid crystal display device 11 and the base member 12 is elastically deformed in the Z-axis direction that is a pressing direction of the pressing operation. This allows the liquid crystal display device 11 to move in the Z-axis direction (the pressing direction) relatively to the base member 12. As illustrated in FIG. 11, the holding member 21 moves downward in the Z-axis direction according to the above-described relative movement of the liquid crystal display device and accordingly, the pressure sensor 13 included in the pressure sensor unit 16 that is fixed to the base member 12 is pressed by the sensor contact projection 21d. Therefore, the pressure sensor 13 effectively detects a pressure from the liquid crystal display device 11. On the other hand, for example, if a user touches the cover glass 11b by mistake without the user's intention of an input operation, the liquid crystal display device 11 and the holding member 21 hardly move in the Z-axis direction. Therefore, the pressure is not detected by the pressure sensor 13 or the detected pressure is not greater than the threshold value and the input errors are appropriately eliminated. When the above-described pressing operation is input, the touch panel pattern 11TP included in the liquid crystal panel 11a of the liquid crystal display device 11 detects the input position. In FIG. 8, a direction in which the elastic member 15 is elastically deformed according to the pressing operation is indicated by an arrow pointing down near the elastic member 15.

When the liquid crystal display device 11 is relatively moved to be closer to the base member 12 with respect to the Z-axis direction according to the pressing operation input to the liquid crystal display device 11 as described earlier, the other end portion of the leaf spring member 18 that is fixed to the liquid crystal display device 11 via the movable side bracket 19 is moved toward the back side with respect to the Z-axis direction as illustrated in FIG. 8 while one end portion of the leaf spring member 18 being fixed to the movable portion 14b of each actuator 14. The leaf spring member 18 is configured to elastically deform in a cantilever manner with the one end portion thereof being fixed as a fulcrum point. According to such a configuration, stress acting on each actuator 14 can be reduced. In FIG. 8, a direction in which the leaf spring member 18 elastically deforms according to the pressing operation is indicated by the arrow pointing down near the movable side bracket 19.

If the pressure detected by the pressure sensor 13 at the time of the pressing operation is greater than the threshold value, it is determined that the input of the pressing operation is correct by a controller, and each actuator 14 is oscillated based on the determination. The oscillation of each actuator 14 can be controlled as appropriate based on the input position of the pressing operation that is detected by the touch panel pattern 11TP. When the actuator 14 is oscillated, as illustrated in FIGS. 8 and 11, the first spring portion 15a of the elastic member 15 that is fixed to the liquid crystal display device 11 and the base member 12 is elastically deformed with respect to the X-axis direction that is an oscillation direction of each actuator 14. This allows the liquid crystal display device 11 to move relatively to the base member 12 with respect to the X-axis direction. In detail, in the oscillation of each actuator 14, the movable portion 14b that is fixed to the liquid crystal display device 11 is moved relatively to and closer to the fixed portion 14a that is fixed to the base member 12 with respect to the X-axis direction, and the liquid crystal display device 11 is vibrated with respect to the base member 12 in the X-axis direction. Accordingly, the liquid crystal display device 11 is vibrated with respect to the base member 12 in the X-axis direction that is a direction perpendicular to the pressing direction and the vibration is transmitted to the finger of the user (an inputter) who has performed the pressing operation.

If the vibrations of the liquid crystal display device 11 become less likely to converge, the user is likely to feel with the user's finger that the liquid crystal display device 11 simply vibrates in the X-axis direction (the direction perpendicular to the pressing direction). If so, the user is less likely to recognize touching of pressing in the Z-axis direction (the pressing direction), for example. In this respect, the holding member 21 of the pressure sensor unit 16 that is mounted in the base member 12 holds the braking member 20 that is in contact with the liquid crystal display device 11. Therefore, the liquid crystal display device 11 that vibrates in the X-axis direction with respect to the base member 12 brakes with the braking member 20. Furthermore, the position of the holding member 21 is adjusted by the position adjusting mechanism 22 with respect to the liquid crystal display device 11 in the Z-axis direction such that the contact state of the braking member 20 and the liquid crystal display device 11 can be adjusted. Accordingly, the braking force of the braking member 20 acting on the liquid crystal display device 11 that vibrates with respect to the base member 12 can be controlled and the vibrations of the liquid crystal display device 11 effectively converge. Therefore, the user easily feels with his/her finger, to which the vibrations are transferred via the liquid crystal display device 11, as if he/she presses a virtual button on the display surface 11DS in the Z-axis direction by lateral force fields. As described above, it can be detected whether the pressing operation is input to the liquid crystal display device 11 and if the pressing operation is input, the liquid crystal display device 11 vibrates to make haptic feedback properly in response to the pressing operation. Furthermore, the pair of actuators 14 that apply vibrations to the liquid crystal display device 11 are electromagnetic actuators each of which includes the fixed portion 14a and the movable portion 14b. The actuators 14 can apply strong vibrations compared to inertia driving actuators and are preferable to achieve the haptic feedback. In FIGS. 8 and 11, the direction in which the elastic member 15 is elastically deformed according to the oscillation of the actuator 14 and the direction in which the liquid crystal display device 11 vibrates are indicated by the arrows pointing left.

Furthermore, as illustrated in FIGS. 10 and 11, the pressure sensor 13 is disposed below the liquid crystal display device 11 while having the braking member 20 and the holding member 21 therebetween. According to such a configuration, when the pressing operation is input to the liquid crystal display device 11, the pressure acting on the liquid crystal display device 11 is transferred to the pressure sensor 1 via the braking member 20 and the holding member 21 and detected. The position of the holding member is adjusted with respect to the liquid crystal display device 11 in the Z-axis direction by the position adjusting mechanism 22 so that the contact state of the liquid crystal display device 11 and the braking member 20 is adjusted and the position relation of the braking member 20 and the holding member 21 with respect to the pressure sensor 13 in the Z-axis direction is adjusted. Accordingly, it can be adjusted such that the holding member 21 always applies pressure to the pressure sensor 13 and therefore, it is preferable to reduce the time lag that may be caused until the pressure is detected by the pressure sensor 13 after the pressing operation is input to the liquid crystal display device 11.

Further, the position adjusting mechanism 22 adjusts the position of the holding member 21 in the Z-axis direction via the pressure sensor 13 and the sensor holding member 23 that holds the pressure sensor 13 from an opposite side from the holding member 21. According to such a configuration, the position of the holding member 21 holding the braking member 20 is adjusted by the position adjusting mechanism 22 in the Z-axis direction via the pressure sensor and the sensor holding member 23 and accordingly, the contact state of the braking member 20 and the liquid crystal display device 11 is adjusted. The contact state of the pressure sensor 13 and the holding member 21 is also adjusted at the same time. Therefore, the adjustment workability is improved compared to a configuration in which each of the contact state of the braking member 20 and the contact state of the pressure sensor 13 is adjusted independently.

As illustrated in FIGS. 2 and 6, the four elastic members 15 and the four pressure sensor units 16 are arranged on the four corner portions of the liquid crystal display device 11, respectively. According to such a configuration, the relative movement of the liquid crystal display device 11 in the Z-axis direction with respect to the base member 12 according to the pressing operation is smoothly performed and the pressure that acts on the liquid crystal display device 11 according to the pressing operation is detected properly. Further, the pair of actuators 14 are arranged on an inner portion of the liquid crystal display device 11 than the braking members 20 and the holding members 21 of the four pressure sensor units 16 arranged on the four corner portions of the liquid crystal display device 11. Therefore, the actuators 14 can vibrate the whole liquid crystal display device 11 and the vibrations of the liquid crystal display device 11 can converge more appropriately with the braking members 20 that are in contact with the respective four corner portions of the liquid crystal display device 11. Particularly, the movable side bracket 19, which is fixed to a middle portion of the liquid crystal display device 11 with respect to the X-axis direction and the Y-axis direction, is attached to the other end portions of the leaf spring members 18. The one end portions of the leaf spring members 18 are fixed to the movable portions 14b of the actuators 14. Therefore, the whole liquid crystal display device 11 can be vibrated most effectively.

As described above, the input device 10 in this embodiment includes the liquid crystal display device 11 (the input member), the base member 12, the actuator 14, the braking member 20, the holding member 21, and the position adjusting mechanism 22. The liquid crystal display device receives input of the pressing operation. The liquid crystal display device 11 is mounted on the base member 12. The actuator 14 is disposed at least on the liquid crystal device 11 side and is configured to vibrate the liquid crystal display device 11 in a direction perpendicular to the pressing direction of the pressing operation. The braking member 20 is disposed to be in contact with the liquid crystal display device 11. The holding member 21 is disposed on the base member 12 side and holds the braking member 20. The position adjusting mechanism 22 adjusts the position of at least one of the liquid crystal display device 11 and the holding member 21 with respect to the pressing direction.

Accordingly, when the actuator 14 is oscillated according to the input of the pressing operation to the liquid crystal display device 11, the liquid crystal display device 11 vibrates in the direction perpendicular to the pressing direction with respect to the base member 12. The vibrations are transferred to the inputter that has input the pressing operation. If the vibrations of the liquid crystal display device 11 become less likely to converge, the inputter is likely to feel that the liquid crystal display device 11 simply vibrates in the direction perpendicular to the pressing direction. If so, the inputter is less likely to recognize touching of pressing in the pressing direction, for example. In this respect, the holding member 21 disposed on the base member 12 side holds the braking member 20 that is in contact with the liquid crystal display device 11. Therefore, the liquid crystal display device 11 that vibrates with respect to the base member 12 brakes with the braking member 20. Furthermore, the position of at least one of the liquid crystal display device 11 and the holding member 21 is adjusted by the position adjusting mechanism 22 in the pressing direction such that the contact state of the braking member 20 and the liquid crystal display device 11 can be adjusted. Accordingly, the braking force of the braking member 20 acting on the liquid crystal display device 11 that vibrates with respect to the base member 12 can be controlled and the vibrations of the liquid crystal display device 11 effectively converge. Therefore, the inputter to which the vibrations are transferred via the liquid crystal display device 11 easily feels as is it presses in the pressing direction and the haptic feedback can be properly made.

The pressure sensor 13 is arranged on the base member 12 and detects the pressure that acts on the liquid crystal display device 11 according to the pressing operation. Accordingly, when the pressing operation is input to the liquid crystal display device 11, the pressure acting on the liquid crystal display device 11 is detected by the pressure sensor 13. Based on the pressure detected by the pressure sensor 13, the actuator 14 is oscillated to vibrate the liquid crystal display device 11 and the vibrations are transferred to the inputter that has input the pressing operation.

Further, the elastic member 15 is fixed to the liquid crystal display device 11 and the base member 12 and is elastically deformable in the pressing direction and in the vibrating direction of the actuator 14. Accordingly, when the pressing operation is input to the liquid crystal display device 11, the elastic member 15 that is fixed to the liquid crystal display device 11 and the base member 12 is elastically deformed in the pressing direction of the pressing operation such that the liquid crystal display device 11 can relatively move in the pressing direction with respect to the base member 12. Accordingly, the pressure acting on the liquid crystal display device 11 can be detected properly by the pressure sensor 13 and input errors are eliminated properly. When the actuator 14 oscillates, the elastic member 15 fixed to the liquid crystal display device 11 and the base member 12 is elastically deformed in the oscillating direction of the actuator 14 such that the liquid crystal display device 11 can relatively move in the oscillating direction with respect to the base member 12.

The elastic member 15 includes a pair of first spring portions 15a and the second spring portion 15b. The first spring portions 15a extend along the pressing direction and one end portions thereof are fixed to the liquid crystal display device 11 or the base member 12. The second spring portion 15b extends continuously from the other end portions of the first spring portions 15a along the direction crossing the pressing direction and is curved. According to such a configuration, when the pressing operation is input to the liquid crystal display device 11, the second spring portion 15b of the elastic member 15 that extends in the direction crossing the pressing direction and is curved is elastically deformed in the pressing direction of the pressing operation. When the actuator 14 oscillates, the pair of first spring portions 15a of the elastic member extending along the pressing direction are elastically deformed in the vibrating direction of the actuator 14. Thus, the first spring portions 15a and the second spring portion 15b of the elastic member 15 are elastically deformed such that the liquid crystal display device 11 can move relatively to the base member 12 smoothly.

The pressure sensor 13 is disposed below the liquid crystal display device 11 while having the braking member 20 and the holding member 21 therebetween. According to such a configuration, when the pressing operation is input to the liquid crystal display device 11, the pressure acting on the liquid crystal display device 11 is transferred to the pressure sensor 13 via the braking member 20 and the holding member 21 and detected. The position of at least one of the liquid crystal display device 11 and the holding member 21 is adjusted by the position adjusting mechanism 22 in the pressing direction, the contact state of the liquid crystal display device 11 and the braking member 20 is adjusted and the position relation of the braking member 20 and the holding member 21 with respect to the pressure sensor 13 in the pressing direction is adjusted. Accordingly, it can be adjusted such that the holding member always applies pressure to the pressure sensor 13 and therefore, such a configuration is preferable to reduce the time lag that may be caused until the pressure is detected by the pressure sensor 13 after the pressing operation is input to the liquid crystal display device 11.

Further, the sensor holding member 23 that holds the pressure sensor 13 from an opposite side from the holding member 21 included and the position adjusting mechanism 22 adjusts the position of the holding member 21 in the pressing direction via the pressure sensor 13 and the sensor holding member 23. Accordingly, the position of the holding member 21 holding the braking member 20 is adjusted by the position adjusting mechanism 22 in the pressing direction via the pressure sensor 13 and the sensor holding member 23. Accordingly, the contact state of the braking member 20 and the liquid crystal display device 11 is adjusted. The contact state of the pressure sensor 13 and the holding member 21 is also adjusted at the same time. Therefore, the adjustment workability is improved.

Furthermore, the actuators 14 are electromagnetic actuators each of which includes the fixed portion 14a and the movable portion 14b. The fixed portion 14a is fixed to the base member 12. The movable portion 14b is fixed to the liquid crystal display device 11 and movable relatively to the fixed portion 14a in the vibrating direction. Accordingly, the movable portion 14b, which is fixed to the liquid crystal display device 11, is moved in the vibrating direction relatively to the fixed portion 14a, which is fixed to the base member 12, such that the liquid crystal display device 11 vibrates with respect to the base member 12. Thus, since the electromagnetic actuator including the fixed portion 14a and the movable portion 14b is used as the actuator 14, the actuators 14 can apply strong vibrations compared to inertia driving actuators and are preferable to achieve the haptic feedback.

The liquid crystal display device 11 has a quadrangular plan view shape and the braking members 20 and the holding members 21 are arranged on the four corner portions of the liquid crystal lay device 11, respectively. The actuators 14 are arranged on an inner portion of the liquid crystal display device 11 compared to the braking members 20 and the holding members 21. According to such a configuration, since the actuators 14 are disposed on the inner portion of the liquid crystal display device 11 with respect to the braking members 20 and the holding members 21 that are disposed on the four corners of the liquid crystal display device 11 having a quadrangular plan view shape, the whole liquid crystal display device 11 can vibrate appropriately according to the oscillation of the actuators 14 and the vibrations of the liquid crystal device 11 can converge more appropriately with the braking members 20 that are in contact with the four corner portions of the liquid crystal display device 11.

The liquid crystal display device 11 includes the liquid crystal panel 11a (the display panel) including the display surface 11DS displaying an image and the touch panel pattern 11TP detecting input positions of the pressing operation on the display surface 11DS. According to such a configuration, when the pressing operation is input based on the image displayed on the display surface 11DS of the liquid crystal panel 11a, the input position can be detected by the touch panel pattern 11TP. Based on the input position of the pressing operation that is detected by the touch panel pattern 11TP, the vibrations applied to the liquid crystal display device 11 by the actuator 14 can be controlled.

Second Embodiment

A second embodiment of the present invention will be described with reference to FIGS. 12 to 16. The second embodiment includes a position adjusting mechanism 122 that is different from that in the first embodiment. Configurations, operations, and effects similar to those in the first embodiment will not be described.

Figure 12:
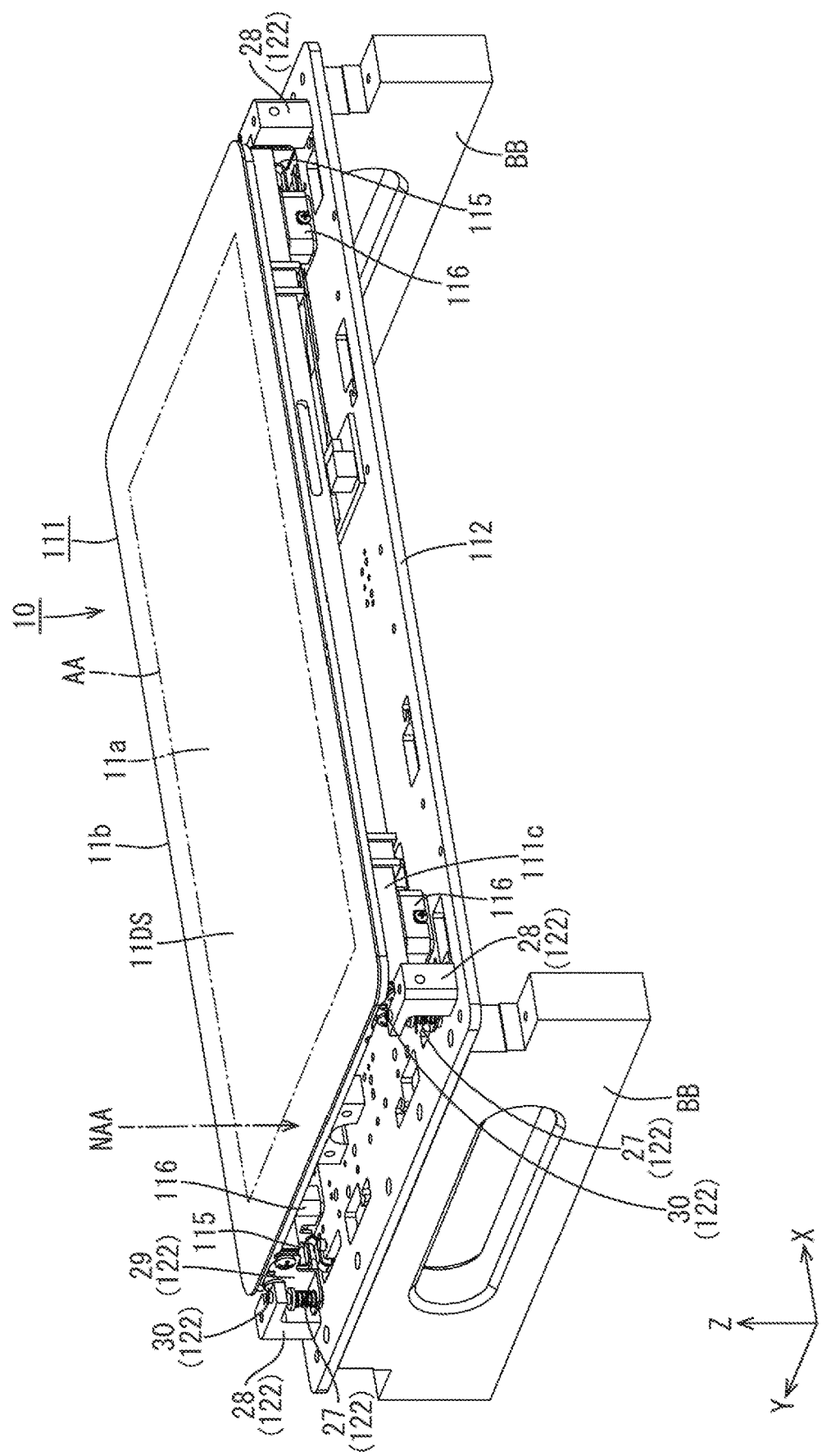
FIG. 12 is a perspective view of an input device according to a second embodiment of the present invention.
Figure 13:
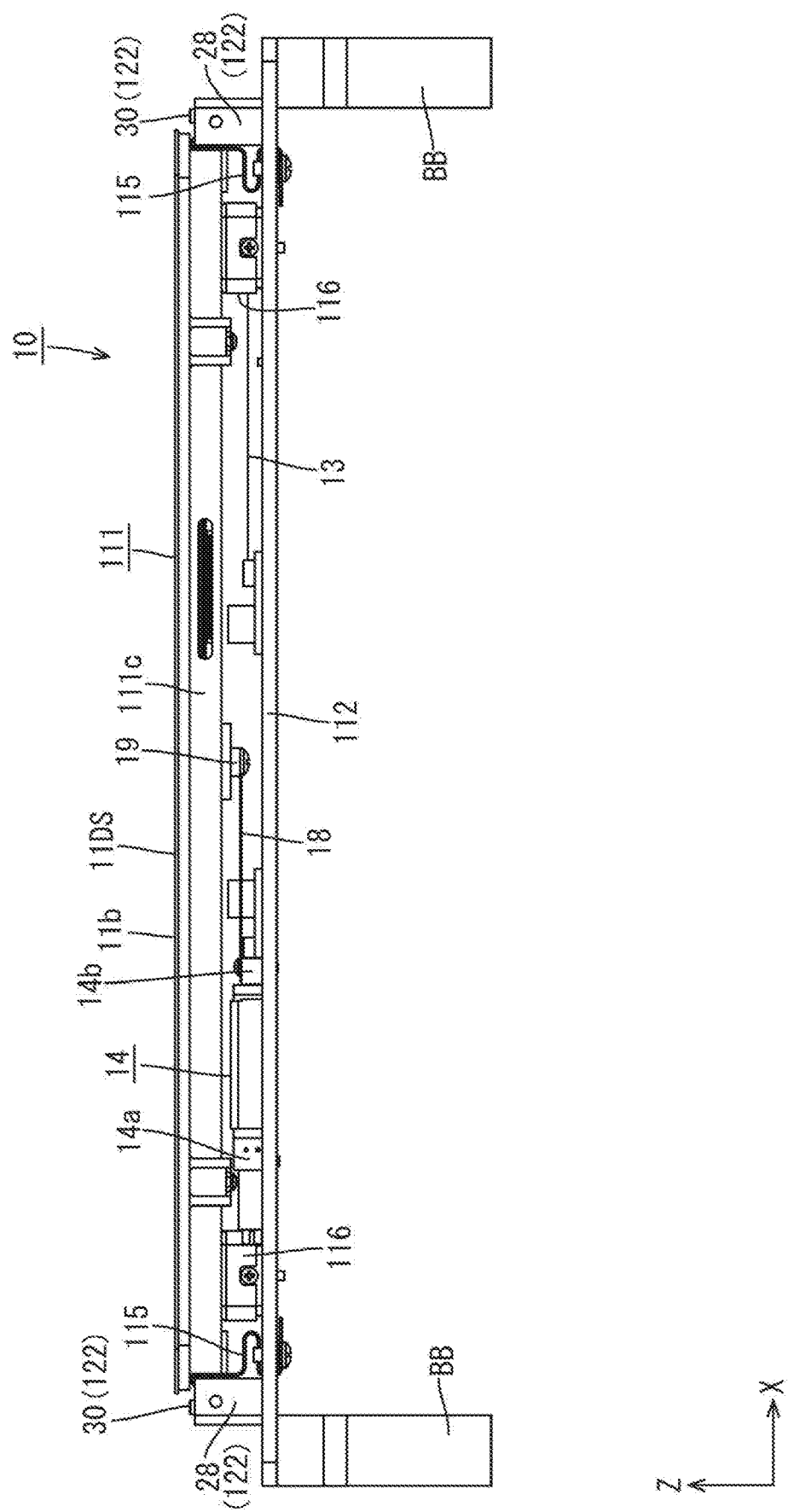
FIG. 13 is a side view of the input device.
Figure 14:
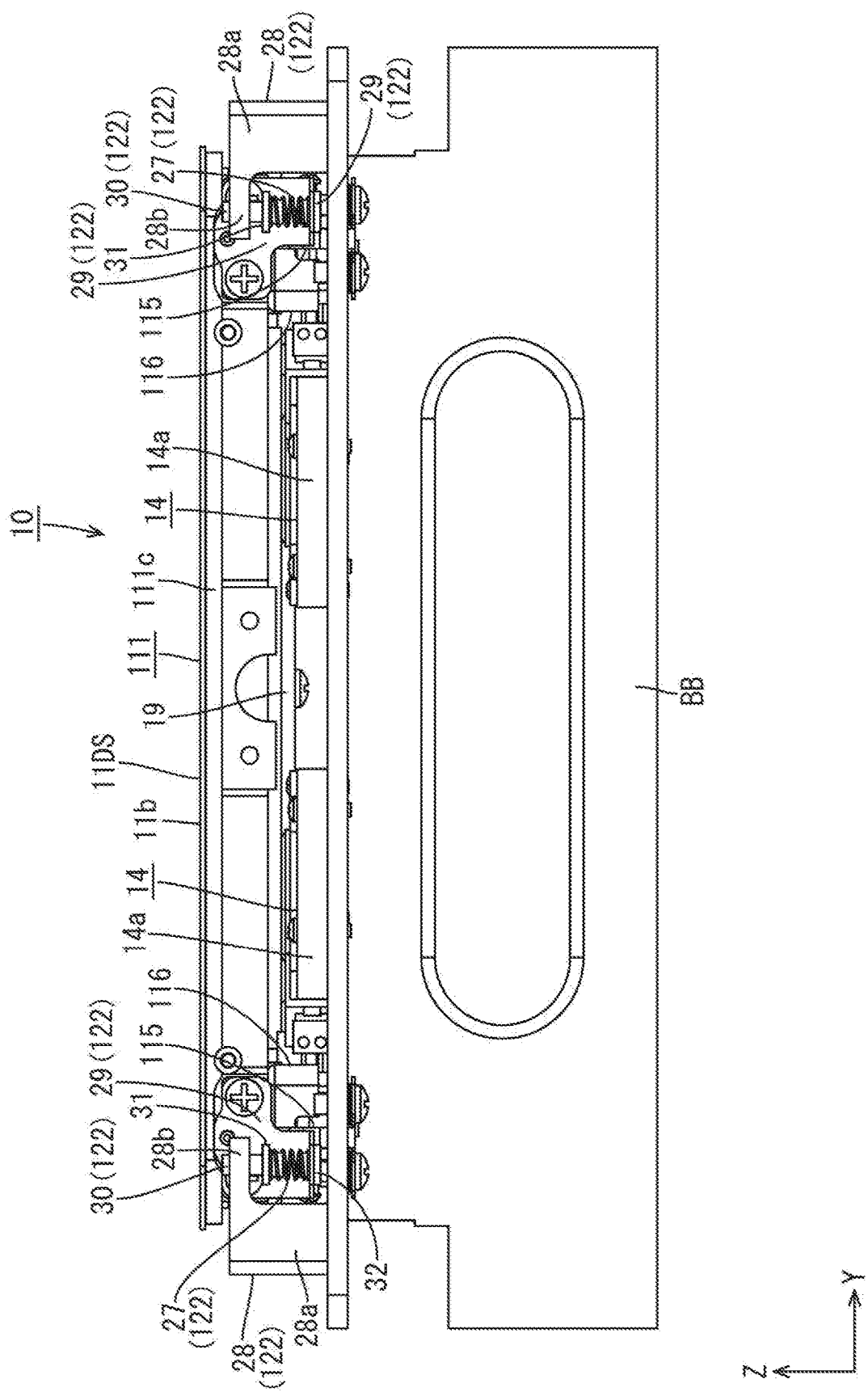
FIG. 14 is a front view of the input device.

As illustrated in FIGS. 12 to 14, the position adjusting mechanism 122 in this embodiment is disposed separately from a pressure sensor unit 116. Four position adjusting mechanisms 122 are disposed next to and outside four corner portions of the liquid crystal display device 111 and four elastic members 115 with respect to the X-axis direction, respectively. A portion of each of the four position adjusting mechanisms 122 is disposed outside the liquid crystal display device 111 with respect to the Y-axis direction.

Figure 15:
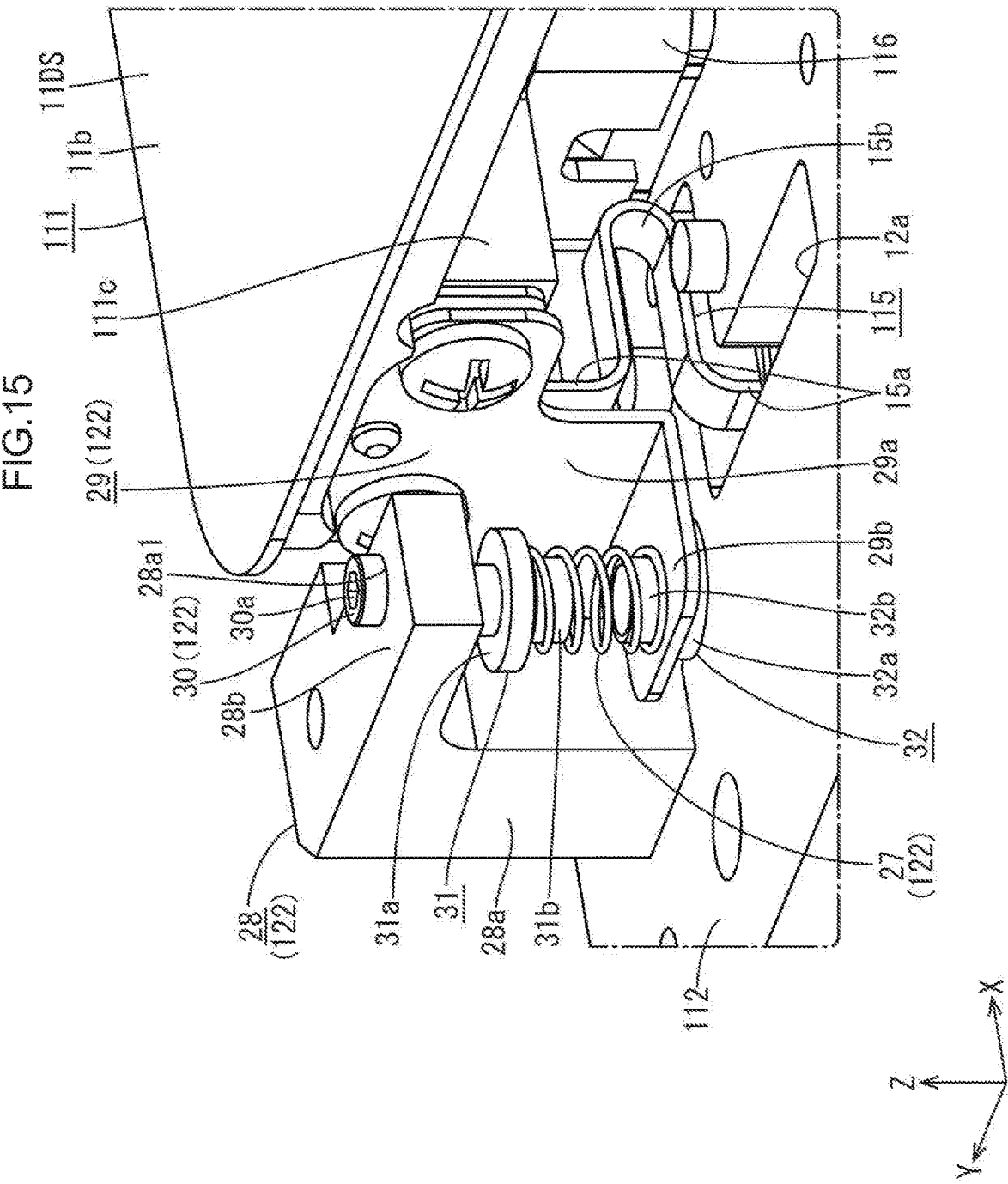
FIG. 15 is an enlarged perspective view of a position adjusting mechanism included in the input device and therearound.
Figure 16:
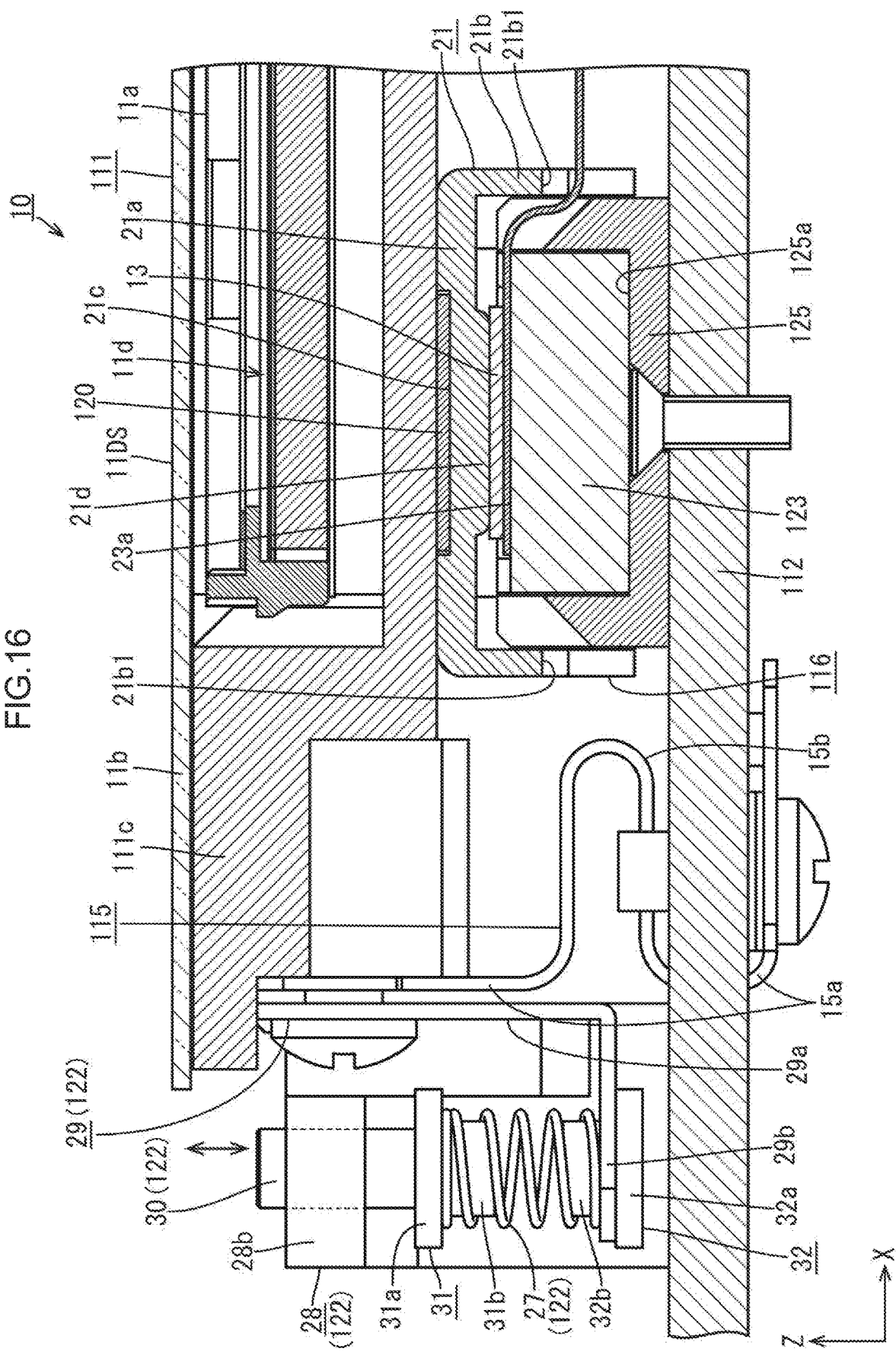
FIG. 16 is an enlarged side sectional view of the position adjusting mechanism included in the input device and therearound.

As illustrated in FIGS. 15 and 16, the position adjusting mechanism 122 at least includes a compression coil spring 27 (a coil spring), a first coil spring holding member 28, a second coil spring holding member 29, and a spring force adjusting member 20. The first coil spring holding member 28 is fixed to a base member 112 and holds the compression coil spring 27. The second coil spring holding member 29 is fixed to the liquid crystal display device 111 and holds the compression coil spring 27. The spring force adjusting member 30 applies a compression force to the compression coil spring 27. The compression coil spring 27 is such that an axial direction thereof matches the Z-axis direction (the pressing direction) and is configured to store a resilient force (a restoring force) when the compression coil spring 27 is compressed along the axial direction from an initial state. The compression coil spring 27 is disposed next to and outside the elastic member 115 with respect to the Y-axis direction.

As illustrated in FIGS. 15 and 16, the first coil spring holding member 28 includes a base-side mount portion 28a and a first spring-side mount portion 28b. The base-side mount portion 28a has a block shape and is fixed to the base member 112. The first spring-side mount portion 28b projects from the base-side mount portion 28a in the Y-axis direction like an cave and the compression coil spring 27 is fixed to the first spring-side mount portion 28b. A first spring mounting member 31 and the spring force adjusting member 30 that are mounted on one end portion of the compression coil spring 27 are mounted on the first spring-side mount portion 28b so as to be movable relatively in the Z-axis direction (the pressing direction). The first spring mounting member 31 includes a first shaft portion 31a and a first receiving portion 31b. The first shaft portion 31a is fit in the compression coil spring 27 at one end portion thereof and has a substantially circular columnar shape so as to have a same axis with the compression coil spring 27. The first receiving portion 31b projects from an end portion of the first shaft portion 31a in a form of an eave and receives the one end portion of the compression coil spring 27 from an outer side with respect to the Z-axis direction. The second coil spring holding member 29 has a substantially L-shape in a side view and includes a casing-side mount portion 29a and a second spring-side mount portion 29b. The casing amide mount portion 29a is fixed to a casing 111c of the liquid crystal display device 111. The second spring-Side mount portion 29b projects outwardly in the X-axis direction from the casing-side mount portion 29a at an edge portion thereof near the base member 112 and the compression coil spring 27 is mounted on the second spring-side mount portion 29b. The second spring-side mount portion 29b receives another end portion of the compression coil spring 27 from an outer side with respect to the Z-axis direction. A second spring mounting member 32 that is attached to the other end portion of the compression coil spring 27 is fixed to the second spring-side mount portion 29b so as not to move relatively in the Z-axis direction. The second spring mounting member 32 includes a second shaft portion 32a and a second receiving portion 32b. The second shaft portion 32a is fit in the compression coil spring 27 at the other end portion thereof and has a substantially circular columnar shape so as to have a same axis with the compression coil spring 27. The second receiving portion 32b projects from an end portion of the second shaft portion 32a in a form of an cave and receives the second spring-side mount portion 29b from an outer side with respect to the Z-axis direction.

As illustrated in FIGS. 15 and 16, the spring force adjusting member 30 has a substantially circular columnar shape so as to have a same axis with the compression coil spring 27. The spring force adjusting member 30 is inserted through a hole 28b1 that extends through the first spring-side mount portion 28b of the first coil spring holding member 28 and a distal end surface of the spring force adjusting member 30 is contacted with the first spring mounting member 31. The spring force adjusting member 30 has screw threads, which are not illustrated, on an outer surface thereof and the screw threads are fit into screw grooves formed on an inner surface of the hole 28b1. The spring force adjusting member 30 has an operation recess portion 30a on an edge surface thereof opposite from the first spring mounting member 31 side. The spring force adjusting member 30 can be operated by fitting a hexagon wrench into the operation recess portion 30a. A tool that is fit in the operation recess portion 30a is rotated to move forward and backward the spring force adjusting member 30 along the Z-axis direction. According to the movement, the first spring mounting member 31 is moved along the Z-axis direction to change a compression state of the compression coil spring 27. Specifically, if the spring force adjusting member 30 is tightened, the first spring mounting member 31 approaches the base member 112 in the Z-axis direction and the compression amount of the compression coil spring 27 increases. According to the increase of the compression amount of the compression coil spring 27, liquid crystal display device 111 moves relatively to and approaches the base member 112 with respect to the Z-axis direction (relatively moves down in FIG. 16) to perform position adjustment. If the spring force adjusting member is loosened, the first spring mounting member 31 moves farther away from the base member 112 in the Z-axis direction and the compression amount of the compression coil spring 27 decreases. According to the decrease of the compression amount of the compression coil spring 27, the liquid crystal display device 111 moves relatively to and farther away from the base member 112 with respect to the Z-axis direction (relatively moves up in FIG. 16) to perform position adjustment. Thus, the position of the liquid crystal display device 111 can be adjusted in the Z-axis direction with respect to the holding member 121 fixed to the base member 112 and the contact state of a braking member 120 and the liquid crystal display device 111 can be adjusted.

As illustrated in FIG. 16, since a pressure sensor unit 116 according to this embodiment does not include the position adjusting mechanism 122, the pressure sensor unit 116 does not include the position adjusting spacer 24 described in the first embodiment. Therefore, the sensor holding member 123 has a block shape that is fit in an inner space of an arrangement recess 125a and does not have the first inclined surface 23c described in the embodiment.

According to the present embodiment, as described before, the position adjusting mechanism 122 includes the compression coil spring 27 (the coil spring), the first coil spring holding member 28, the second coil spring holding member 29, and the spring force adjusting member 30. The first coil spring holding member 28 is fixed to the base member 112 and holds the compression coil spring 27. The second coil spring holding member 29 is fixed to the liquid crystal display device 111 and holds the compression coil spring 27. The spring force adjusting member 30 applies a compression force to the compression coil spring 27. The compression force or a tension force is applied by the spring force adjusting member 30 to the compression coil spring 27 that is held by the first coil spring holding member 28 and the second coil spring holding member 29 so that the liquid crystal display device 111 where the second coil spring holding member 29 is fixed can be moved in the pressing direction relatively to the base member 112 where the first coil spring holding member 28 is fixed. Accordingly, the position of the liquid crystal display device 111 can be adjusted in the pressing direction with respect to the holding member 121 that is disposed on the base member 112 side. Therefore, the contact state of the braking member 120 with respect to the liquid crystal display device 111 can be adjusted.

Third Embodiment

A third embodiment of the present invention will be described with reference to FIGS. 17 to 20. The third embodiment includes an elastic member 215 that is different from that the first embodiment. Configurations, operations, and effects similar to those in the first embodiment will not be described.

Figure 17:
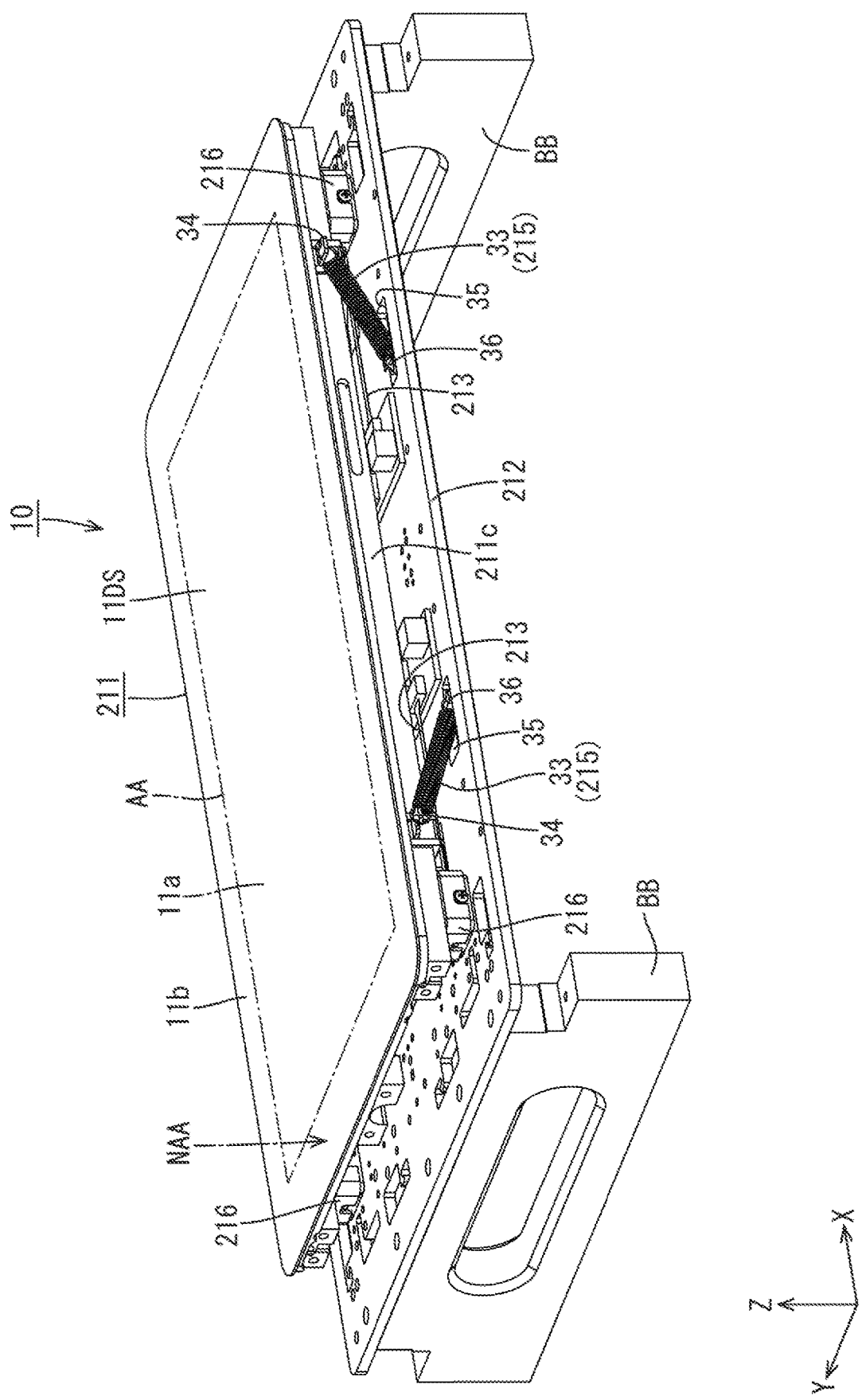
FIG. 17 is a perspective view of an input device according to a third embodiment of the present invention.
Figure 18:
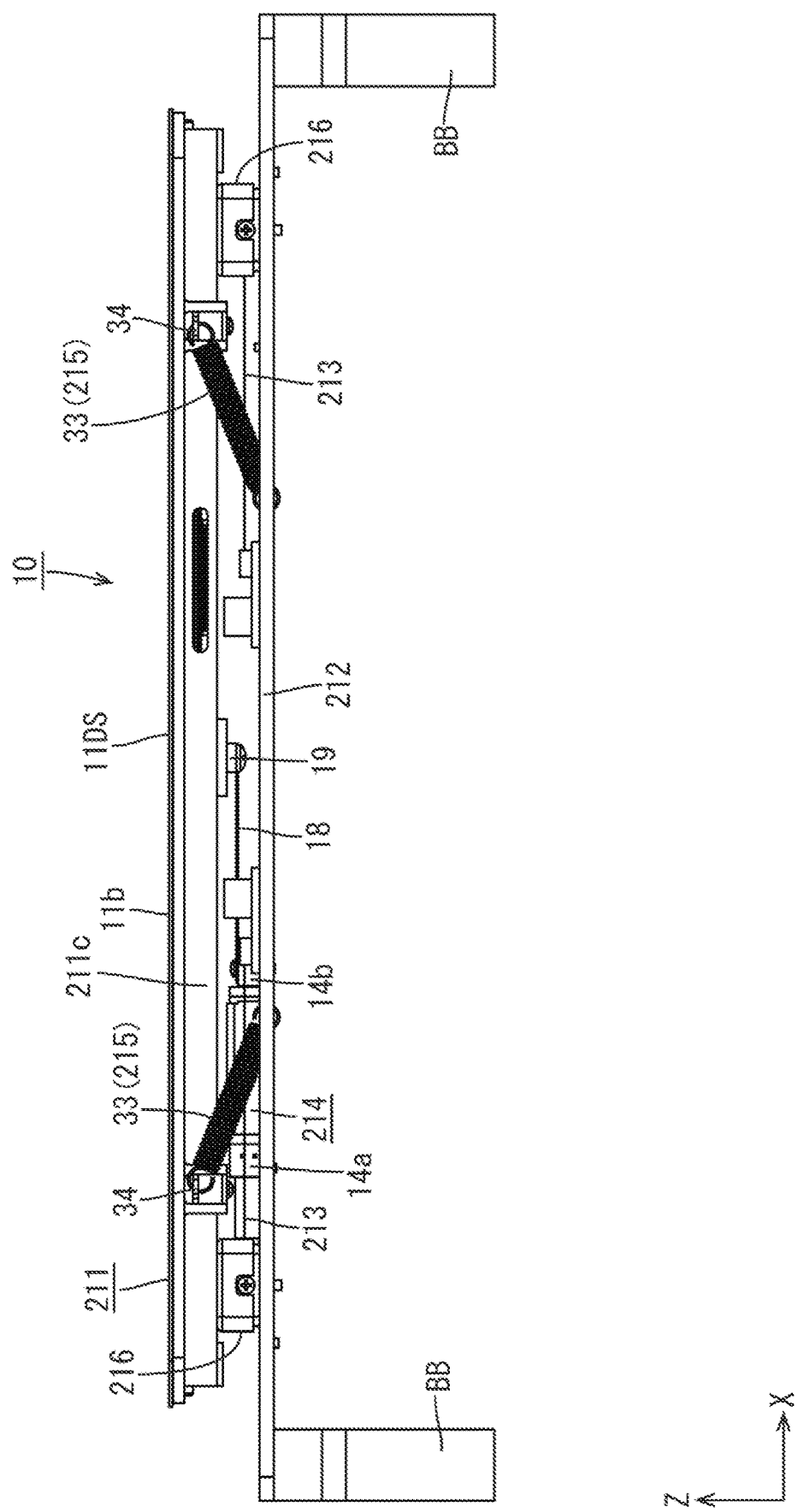
FIG. 18 is a side view of the input device.
Figure 19:
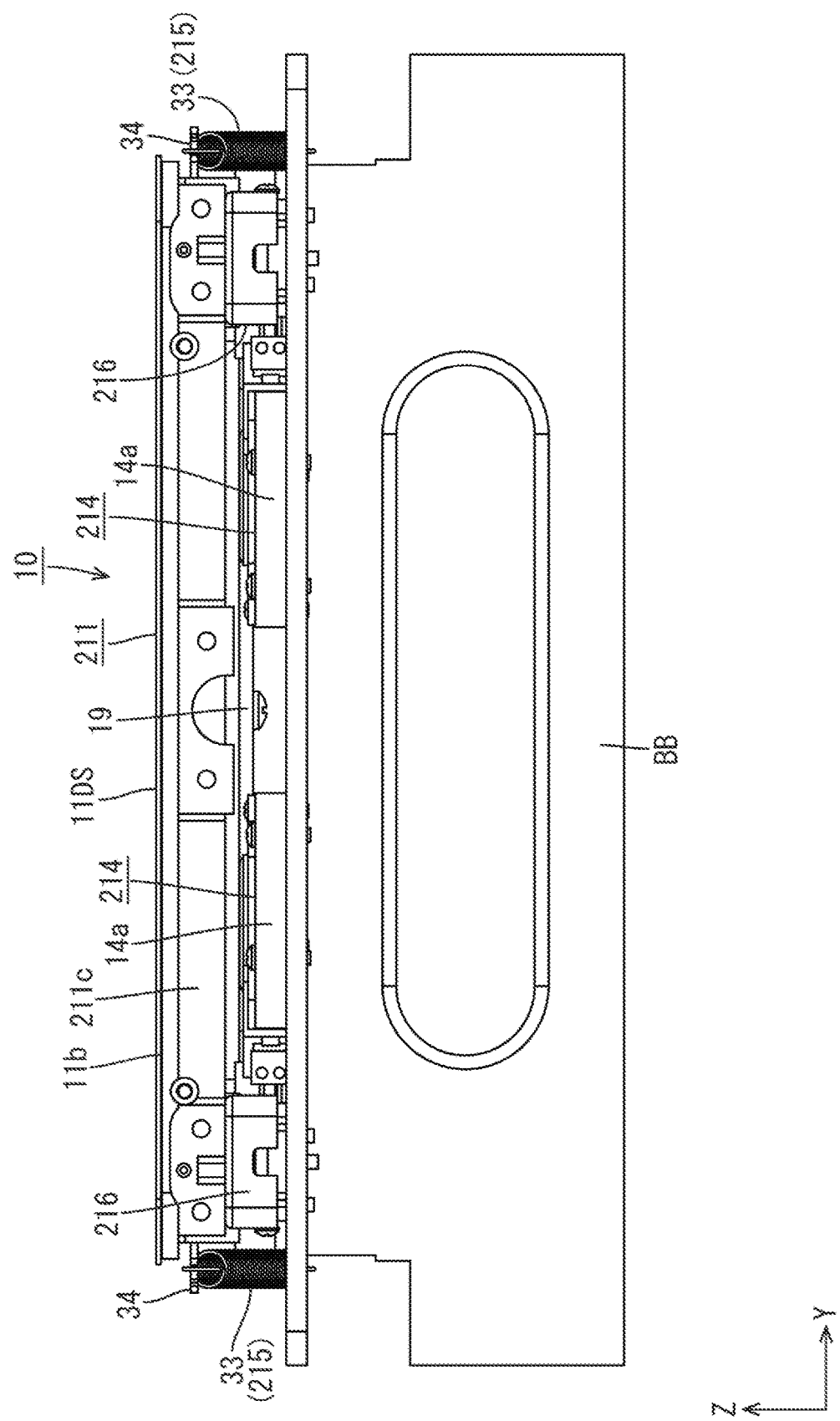
FIG. 19 is a front view of the input device.

As illustrated in FIGS. 17 to 19, the elastic member 215 in this embodiment is a tension coil spring 33. The tension coil spring 33 stores a resilient force (a restoring force) in the axial direction thereof when the tension coil spring 33 pulled along the axial direction from an initial state. The tension coil spring 33 is fixed to a liquid crystal display device 211 at one end thereof and fixed to a base member 212 at another end thereof. The tension coil spring 33 is held such that the axial direction thereof crosses the X-axis direction and the Z-axis direction. This reduces an arrangement space in the Z-axis direction where the tension coil spring 33 is disposed while keeping an effective length dimension of the tension coil spring 33. The tension coil spring 33 can be elastically deformed in both of the X-axis direction and the Z-axis direction. Four tension coil springs 33 are respectively disposed next to four pressure sensor units 216 that are disposed at four corner portions of the liquid crystal display device 211, respectively. The four tension coil springs 33 are disposed next to the four pressure sensor units 216 and on a center side in the X-axis direction with respect to the four pressure sensor units 216 (refer FIG. 18), respectively. The four tension coil springs 33 are disposed next to and outside the liquid crystal display device 211 and the four pressure units 216, respectively, with respect to the Y-axis direction (FIG. 19). The four tension coil springs 33 are disposed so as to be symmetrical with respect to each of the X-axis direction and the Y-axis direction.

Figure 20:
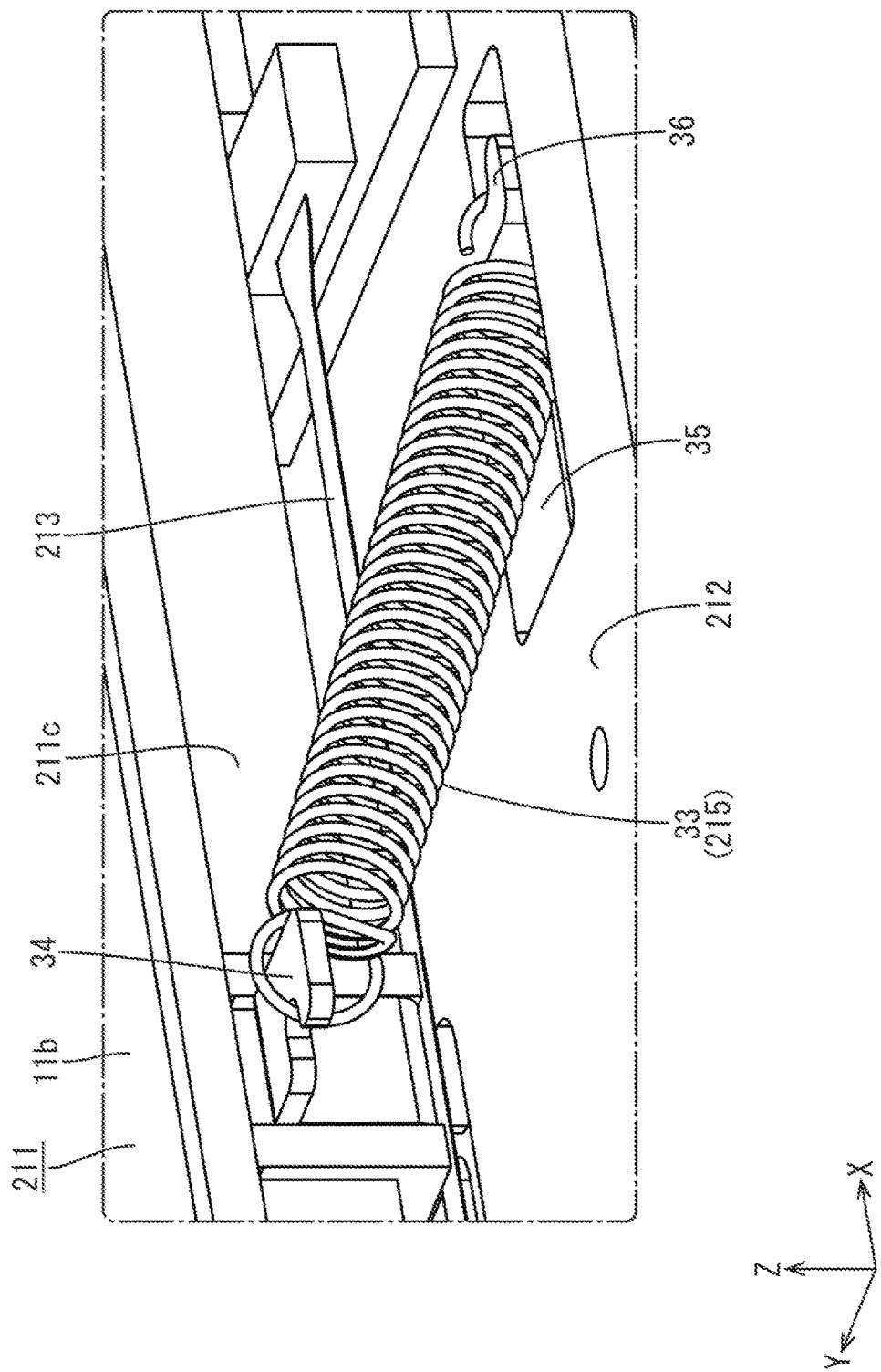
FIG. 20 is an enlarged perspective view of a tension coil spring included in the input device and therearound.

As illustrated in FIG. 20, a casing 211c of the liquid crystal display device 211 includes first spring mount portions 34 of a hook shape on an outer surface thereof that extends along the X-axis direction. One end of the tension coil spring 33 is fixed to the first spring mount portion 34. The base member 212 includes spring insertion holes 35 through which another end of the tension coil spring 33 is inserted. The base member 212 includes second spring mount portions 36 of a hook shape on hole edges of the spring insertion holes 35, respectively. Another end of each tension coil spring 33 is fixed to the second spring mount portion 36. According to such a configuration, if the pressing operation is input to the liquid crystal display device 211, the tension coil rings are elastically deformed in the Z-axis direction (the pressing direction). Accordingly, if actuators 214 are oscillated, the tension coil springs are elastically deformed in the X-axis direction (an oscillating direction of the actuator 214). Further, the tension coil springs 33 always apply the tension force toward the base member 212 to the liquid crystal display device 211 and therefore, pressure sensors 213 always receive pressure from the liquid crystal display device 211. Accordingly, such a configuration is preferable to cancel time lag that may be caused until the pressure is detected by the pressure sensor 213 after the pressing operation is input to the liquid crystal display device 211.

As described before, according to this embodiment, the elastic member 215 is tension coil spring 33 one end of which is fixed to the liquid crystal display device 211 and another end of which is fixed to the base member 212. According to such a configuration, if the pressing operation is input to the liquid crystal display device 211, the tension coil springs 33 are elastically deformed in the pressing direction. If the actuators 214 are oscillated, the tension coil springs 33 are elastically deformed in the oscillating direction of the actuators 214. Further, the tension coil springs 33 always apply the tension force toward the base member 212 to the liquid crystal display device 211 and therefore, the pressure sensors 213 always receive pressure from the liquid crystal display device 211. According to such a configuration preferable to cancel time lag that may be caused until the pressure is detected by the pressure sensor 213 after the pressing operation is input to the liquid crystal display device 211.

Other Embodiments

The present invention is not limited to the embodiments, which have been described using the foregoing descriptions and the drawings. For example, embodiments described below are also included in the technical scope of the present invention.

(1) in each of the above embodiments, the braking members and the pressure sensor units (the pressure sensors) are arranged near the four corner portions of the liquid crystal display device and the base member, respectively. However, the specific number and the specific arrangement of the braking members and the pressure sensor units (the pressure sensors) in the liquid crystal display device and the base member can be altered as appropriate.

(2) In each of the above embodiments, the pressure sensor unit includes the pressure sensor and the braking member. However, the braking member may be included separately from the pressure sensor unit. In such a configuration, a holding member for holding the braking member is necessary in addition to the pressure sensor unit.

(3) Other than each of the above embodiments, the planar shape of the braking member and the number and the arrangement of the braking members with respect to the pressure sensor units may be altered as appropriate.

(4) In the first embodiment, the axial direction of the position adjusting screw is parallel to the Y-axis direction. However, the axial direction of the position adjusting screw may be parallel to the X-axis direction. In such a configuration, inclined surfaces of the sensor holding member and the position adjusting spacer may be inclined with respect to the Z-axis direction and the X-axis direction.

(5) Other than the above (4), the axial direction of the position adjusting screw may be parallel to the Z-axis direction. In such a case, the position adjusting spacer is not included and a distal end surface of the shaft portion of the position adjusting screw may be directly contacted with the sensor holding member.

(6) In the first and second embodiments, the second spring portion of the elastic member has a laid "U" shape in a side view; however, the specific shape of the second spring portion may be altered as appropriate. Specifically, for example, the second spring portion may have a laid "V" shape or a laid "W" shape in a side view. Namely, the curved portion of the second spring portion may not necessarily have a curved shape but may be configured with straight lines.

(7) In the first and second embodiments, the second spring portion of the elastic member has only one curved portion but may have two or more curved portions.

(8) In the second embodiment, the compression coil spring is used as the coil spring and the spring force compression coil spring. However, the tension coil spring may be used as the coil spring and the spring force adjusting member may apply a tension force to the tension coil spring.

(9) In the second embodiment, the position adjusting mechanism includes the compression coil spring but may not include the compression spring. In such a configuration, a distal end surface of the spring adjusting member may be contacted with the second spring side mount portion of the second spring holding member and according to the forward or backward movement of the spring force adjusting member, the liquid crystal display device to which the second spring holding member is fixed and the base member to which the first spring holding member is fixed may be relatively moved in the pressing direction.

(10) In the second embodiment, the pressure sensor unit is configured not to include the position adjusting mechanism. However, the pressure sensor unit may include the position adjusting mechanism similar to that of the first embodiment. Such a configuration necessarily includes two position adjusting mechanisms.

(11) In the third embodiment, the tension coil spring, which is the elastic member, is arranged such that the axial direction thereof is inclined with respect to the X-axis direction and the Z-axis direction. However, the tension coil spring may be arranged such that the axial direction thereof is inclined with respect to the Y-axis direction and the Z-axis direction. The axial direction of the tension coil spring may be parallel to one of the X-axis direction, the Y-axis direction, and the Z-axis direction.

(12) Each of the above embodiments includes the pressure sensor of a pressure-sensitive ink type but may include a pressure sensor of a piezoelectric element type.

(13) In each of the above embodiments, the electromagnetic actuators are used as the actuators and the leaf spring member attached to the movable portion of the actuator is made of metal. However, the material of the leaf spring member may be synthetic resin material. The shape and configuration of the leaf spring member may be altered.

(14) In each of the above embodiments, the electromagnetic actuators are used as the actuators and the movable portion of the actuator is mounted on the liquid crystal display device via the leaf spring member. However, an elastic member other than the leaf spring member may be used. The leaf spring member may not be included and the movable portion may be mounted on the liquid crystal display device without having the leaf spring member therebetween.

(15) Each of the above embodiments includes a pair of actuators. However, the number of the actuators may be one, three or more.

(16) Each of the above embodiments includes electromagnetic actuators as the actuators. However, the actuators may be inertial actuators such as piezo actuators and linear actuators. In such a configuration, the inertial actuators are not fixed to the base member side but only fixed to the liquid crystal display device side.

(17) Each of the above embodiments includes the in-cell type touch panel pattern that is integrated in the liquid crystal panel. However, the out-cell type touch panel pattern that is included on the front side of the liquid crystal panel may be used.

(18) Each of the above embodiments includes the self-capacitive type touch panel pattern. However, a mutual-capacitive type touch panel pattern may be used. The planar shape of the touch electrode included in the touch panel pattern may be a quadrangle, a circle, a pentagon, or a polygon having more than five corners in addition to a diamond shape as appropriate.

(19) In each of the above embodiments, the liquid crystal display device includes the touch panel pattern. However, the liquid crystal display device may not include a touch panel pattern.

(20) In each of the above embodiments, the input device (the liquid crystal display device and the base member) has a horizontally long quadrangular plan view shape. However, the plan view shape of the input device may be a quadrangle, a square, an oval, an ellipse, a circle, a trapezoid, or a shape partially having a curved outline.

(21) Other than each of the above embodiments, specific uses of the input device may be altered as appropriate.

(22) In each of the above embodiments, the liquid crystal display device includes the liquid crystal panel. However, liquid crystal display devices including other types of display panels (e.g., plasma display panels (PDPs), organic EL panels, electrophoretic display panels (EPDs), and micro electro mechanical systems (MEMS) display panels) may be used.

EXPLANATION OF SYMBOLS

10: Input device, 11, 111, 211: Liquid crystal display device (Input member), 11a: Liquid crystal panel (Display panel), 11DS: Display surface, 11TP: Touch panel pattern, 12, 112, 212: Base member, 13, 213: Pressure sensor, 14, 214: Actuator, 14a: Fixed portion, 14b: Movable portion, 15, 115, 215: Elastic member, 15a: First spring portion, 15b: Second spring portion, 20, 120: Braking member, 21: Holding member, 22, 122: Position adjusting mechanism, 23, 123: Sensor holding member, 27: Compression coil spring (Coil spring), 28: First coil spring holding member, 29: Second coil spring holding member, 30: Spring force adjusting member, 33: Tension coil spring

The invention claimed is:
1. An input device comprising:
an input member to which a pressing operation is input;
a base member on which the input member is mounted;
an actuator disposed at least on an input member side and configured to vibrate the input member in a direction perpendicular to a pressing direction of the pressing operation;
a braking member disposed to be in contact with the input member;
a holding member disposed on a base member side and holding the braking member;
a position adjusting mechanism configured to adjust a position of at least one of the input member and the holding member with respect to the pressing direction;
a pressure sensor disposed on the base member and detecting a pressure that acts on the input member according to the pressing operation; and
an elastic member mounted on the input member and the base member and being elastically deformable in the pressing direction and a vibrating direction of the actuator, wherein
the elastic member includes a pair of first spring portions and a second spring portion,
the first spring portions extend along the pressing direction and one end portions of the first spring portions are respectively fixed to the input member or the base member, and
the second spring portion is continuous from another ends of the first spring portions and extends along a direction crossing the pressing direction and is curved.

2. The input device according to claim 1, wherein
the position adjusting mechanism includes a coil spring, a first coil spring holding member, a second coil spring holding member, and a spring force adjusting member,
the first coil spring holding member is fixed to the base member and holds the coil spring,
the second coil spring holding member is fixed to the input member and holds the coil spring, and
the spring force adjusting member applies a compression force or a tension force to the coil spring.

3. The input device according to claim 1, wherein the actuator is an electromagnetic actuator that includes a fixed portion and a movable portion, the fixed portion is fixed to the base member, and the movable portion is fixed to the input member and movable relatively to the fixed portion in the vibrating direction.

4. The input device according to claim 1, wherein
the input member has a quadrangular plan view shape,
the braking member includes braking members and the holding member includes holding members, and the braking members and the holding members are disposed at four corner portions of the input member, respectively, and
the actuator is disposed on an inner portion of the input member compared to the braking members and the holding members.

5. The input device according to claim 1, further comprising:
a display panel including a display surface displaying images; and
a touch panel pattern for detecting an input position of the pressing operation on the display surface.

6. The input device according to claim 1, wherein the pressure sensor is disposed such that the braking member and the holding member are disposed between the pressure sensor and the input member.

7. The input device according to claim 6, further comprising a sensor holding member holding the pressure sensor from an opposite side from the holding member side, wherein
the position adjusting mechanism is configured to adjust a position of the holding member with respect to the pressing direction via the pressure sensor and the sensor holding member.

8. An input device comprising:
an input member to which a pressing operation is input;
a base member on which the input member is mounted;
an actuator disposed at least on an input member side and configured to vibrate the input member in a direction perpendicular to a pressing direction of the pressing operation;
a braking member disposed to be in contact with the input member;
a holding member disposed on a base member side and holding the braking member;
a position adjusting mechanism configured to adjust a position of at least one of the input member and the holding member with respect to the pressing direction;
a pressure sensor disposed on the base member and detecting a pressure that acts on the input member according to the pressing operation; and
a sensor holding member holding the pressure sensor from an opposite side from the holding member side, wherein
the pressure sensor is disposed such that the braking member and the holding member are disposed between the pressure sensor and the input member, and
the position adjusting mechanism is configured to adjust a position of the holding member with respect to the pressing direction via the pressure sensor and the sensor holding member.

9. The input device according to claim 8, wherein the actuator is an electromagnetic actuator that includes a fixed portion and a movable portion, the fixed portion is fixed to the base member, and the movable portion is fixed to the input member and movable relatively to the fixed portion in the vibrating direction.

10. The input device according to claim 8, wherein
the input member has a quadrangular plan view shape,
the braking member includes braking members and the holding member includes holding members, and the braking members and the holding members are disposed at four corner portions of the input member, respectively, and
the actuator is disposed on an inner portion of the input member compared to the braking members and the holding members.

11. The input device according to claim 8, further comprising:
a display panel including a display surface displaying images; and
a touch panel pattern for detecting an input position of the pressing operation on the display surface.

12. The input device according to claim 8, further comprising an elastic member mounted on the input member and the base member and being elastically deformable in the pressing direction and a vibrating direction of the actuator.

13. The input device according to claim 12, wherein the elastic member is a tension coil spring, one end of the tension coil spring is fixed to the input member and another end thereof is fixed to the base member.

14. An input device comprising:
an input member to which a pressing operation is input;
a base member on which the input member is mounted;
an actuator disposed at least on an input member side and configured to vibrate the input member in a direction perpendicular to a pressing direction of the pressing operation;
a braking member disposed to be in contact with the input member;
a holding member disposed on a base member side and holding the braking member;
a position adjusting mechanism configured to adjust a position of at least one of the input member and the holding member with respect to the pressing direction;
a display panel including a display surface displaying images; and
a touch panel pattern for detecting an input position of the pressing operation on the display surface.

15. The input device according to claim 14, wherein
the position adjusting mechanism includes a coil spring, a first coil spring holding member, a second coil spring holding member, and a spring force adjusting member,
the first coil spring holding member is fixed to the base member and holds the coil spring,
the second coil spring holding member is fixed to the input member and holds the coil spring, and
the spring force adjusting member applies a compression force or a tension force to the coil spring.

16. The input device according to claim 14, wherein the actuator is an electromagnetic actuator that includes a fixed portion and a movable portion, the fixed portion is fixed to the base member, and the movable portion is fixed to the input member and movable relatively to the fixed portion in the vibrating direction.

17. The input device according to claim 14, wherein
the input member has a quadrangular plan view shape,
the braking member includes braking members and the holding member includes holding members, and the braking members and the holding members are disposed at four corner portions of the input member, respectively, and
the actuator is disposed on an inner portion of the input member compared to the braking members and the holding members.

18. The input device according to claim 14, further comprising a pressure sensor disposed on the base member and detecting a pressure that acts on the input member according to the pressing operation.

19. The input device according to claim 18, further comprising an elastic member mounted on the input member and the base member and being elastically deformable in the pressing direction and a vibrating direction of the actuator.

20. The input device according to claim 19, wherein the elastic member is a tension coil spring, one end of the tension coil spring is fixed to the input member and another end thereof is fixed to the base member.

* * * * *